(12) United States Patent
Hara et al.

(10) Patent No.: US 7,528,577 B2
(45) Date of Patent: May 5, 2009

(54) ELECTRONIC APPARATUS WITH RECHARGEABLE BATTERY

(75) Inventors: Yasushi Hara, Kawasaki (JP); Yoshiyasu Nakashima, Kawasaki (JP); Satoshi Kazama, Kawasaki (JP); Koichi Yokota, Kawasaki (JP); Akira Shiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 292 days.

(21) Appl. No.: 11/443,204

(22) Filed: May 31, 2006

(65) Prior Publication Data

US 2007/0188144 A1 Aug. 16, 2007

(30) Foreign Application Priority Data

Feb. 15, 2006 (JP) ............................. 2006-037553

(51) Int. Cl.
*H02J 7/00* (2006.01)
*G06F 11/30* (2006.01)
*H04B 1/38* (2006.01)

(52) U.S. Cl. ........................ 320/132; 713/340; 455/572

(58) Field of Classification Search ................. 320/132, 320/133, 134; 365/229; 702/63; 455/572, 455/573; 713/340
See application file for complete search history.

(56) References Cited

U.S. PATENT DOCUMENTS

| | | | | |
|---|---|---|---|---|
| 5,410,141 A * | 4/1995 | Koenck et al. | ......... | 235/472.02 |
| 5,789,733 A * | 8/1998 | Jachimowicz et al. | ....... | 235/492 |
| 5,954,576 A * | 9/1999 | Coulter et al. | ................ | 453/17 |
| 5,955,869 A * | 9/1999 | Rathmann | ................... | 320/132 |
| 6,269,342 B1 * | 7/2001 | Brick et al. | .................... | 705/20 |
| 6,329,794 B1 * | 12/2001 | Oeda et al. | ................... | 320/132 |
| 6,863,247 B2 * | 3/2005 | Horst | ...................... | 246/187 A |
| 7,058,484 B1 * | 6/2006 | Potega | ......................... | 700/297 |
| 2001/0050943 A1 * | 12/2001 | Mahany | ...................... | 375/130 |
| 2001/0055986 A1 * | 12/2001 | Odagiri | ...................... | 455/572 |
| 2002/0024312 A1 * | 2/2002 | Takagi | .................... | 318/568.12 |
| 2002/0082059 A1 | 6/2002 | Nariai et al. | | |
| 2003/0121981 A1 * | 7/2003 | Slutsky et al. | .......... | 235/462.45 |
| 2005/0070339 A1 * | 3/2005 | Kim | ........................... | 455/572 |
| 2006/0015758 A1 * | 1/2006 | Yoon et al. | ................... | 713/300 |

FOREIGN PATENT DOCUMENTS

| | | |
|---|---|---|
| JP | 2000-253142 | 9/2000 |
| JP | 2002-007002 | 1/2002 |
| JP | 2002-199062 | 7/2002 |

* cited by examiner

*Primary Examiner*—Akm E Ullah
*Assistant Examiner*—M'Baye Diao
(74) *Attorney, Agent, or Firm*—Staas & Halsey LLP

(57) ABSTRACT

An information processor of an electronic apparatus includes a power manager managing power of a secondary battery, and has major functions and a supplementary function. The power manager initiates restriction of the supplementary function, when detected present remaining battery power of the secondary battery is below a threshold. The power manager computes the threshold for the secondary battery or a set operating time for the major functions according to the remaining battery power at the threshold, in accordance with received user input information and power consumption rates corresponding to the major functions. The power manager computes an operating time available for the major functions in accordance with detected remaining battery power of the secondary battery and the power consumption rates corresponding to the major functions. The power manager computes an operating time available for the supplemental function in accordance with the power consumption rate corresponding to the supplemental function.

20 Claims, 19 Drawing Sheets

TABLE OF FUNCTIONS AND POWER CONSUMPTIONS

| FUNCTIONS | POWER CONSUMPTION |
|---|---|
| TELEPHONE VOICE COMMUNICATION | XXX mW |
| INCOMING CALL AWAITING | XXX mW |
| ELECTRONIC MAIL | XXX mW |
| VIDEO PHONE | XXX mW |
| PoC | XXX mW |
| MUSIC REPLAY | XXX mW |
| GAME 1 | XXX mW |
| GAME 2 | XXX mW |

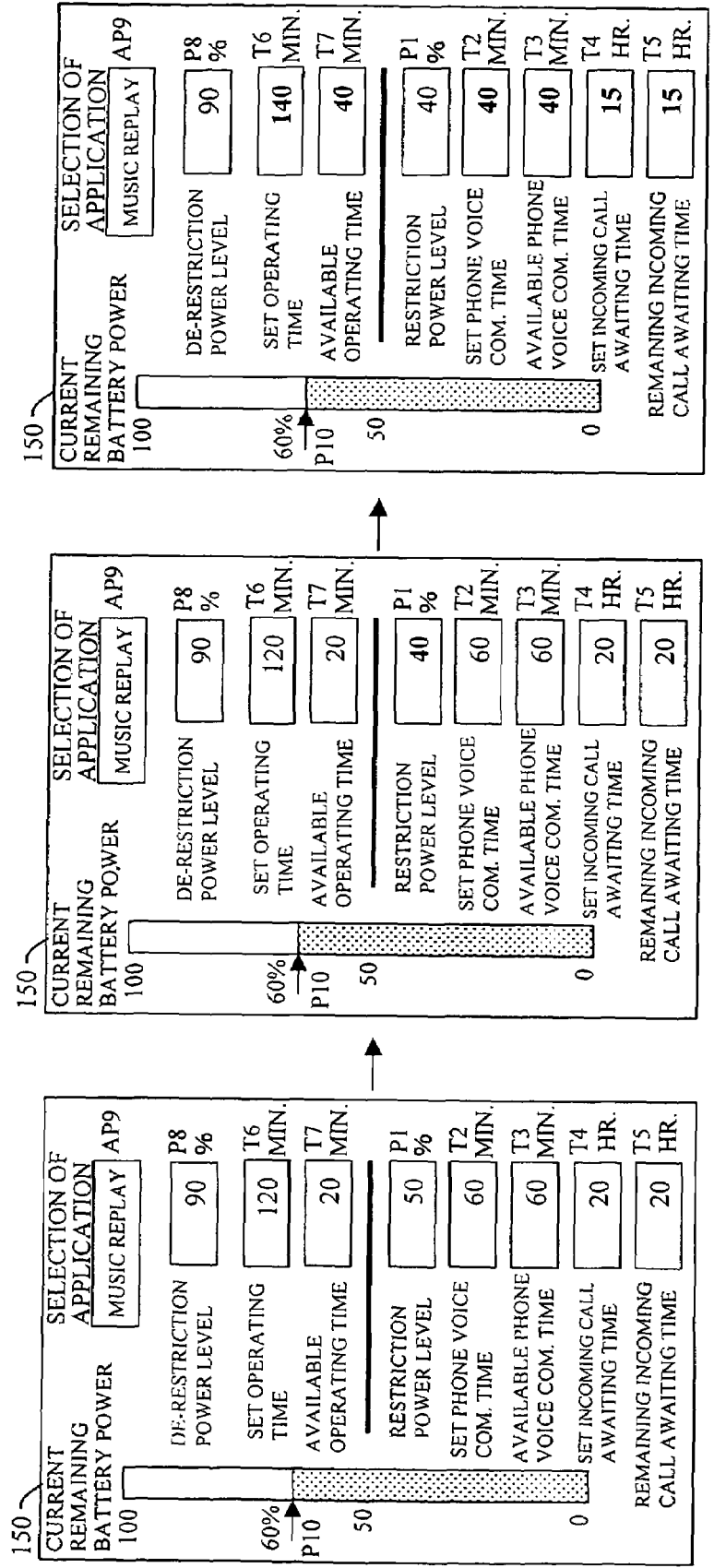
FIG. 9A a) INITIAL PICTURE OF POWER MANAGEMENT
FIG. 9B b) CHANGE BATTERY POWER LEVEL FOR FUNCTION RESCTRICTION
FIG. 9C c) AFTER RE-COMPUTATION

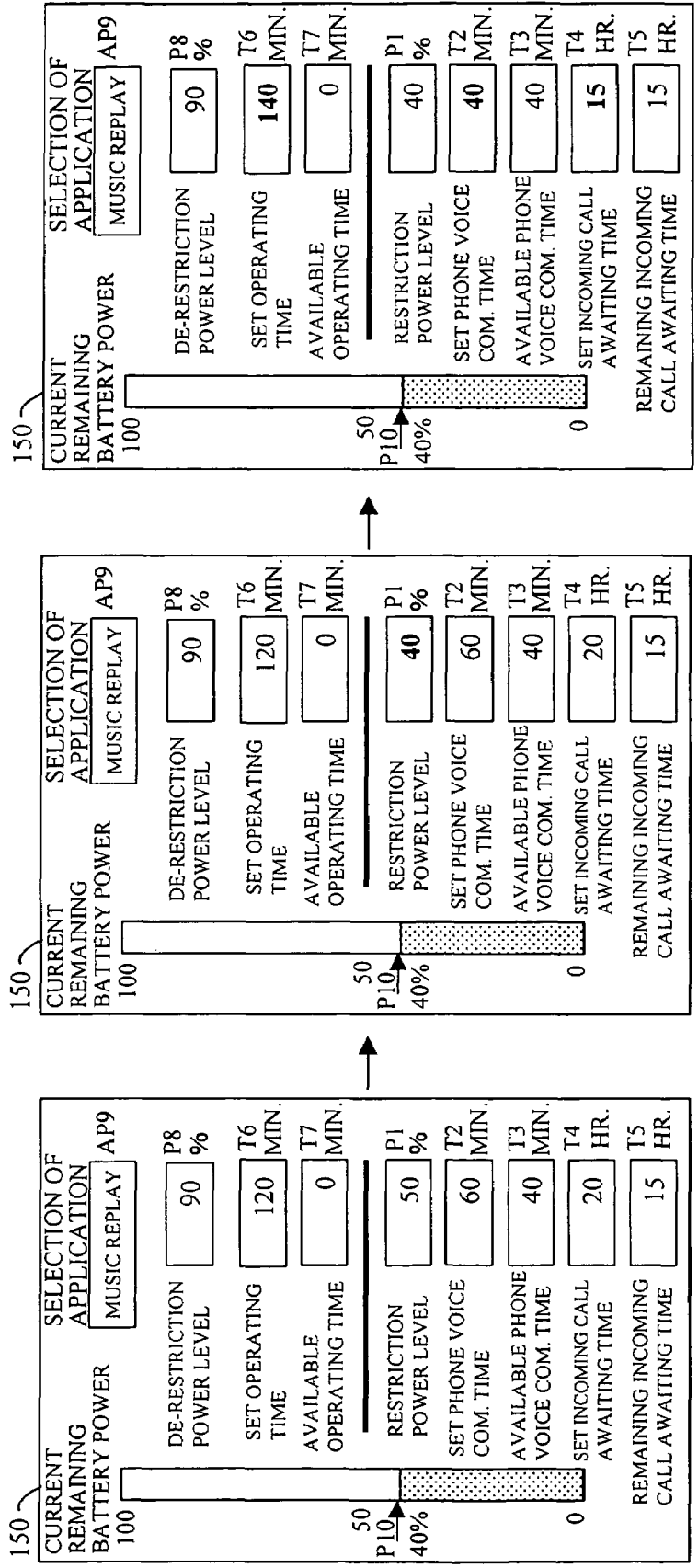

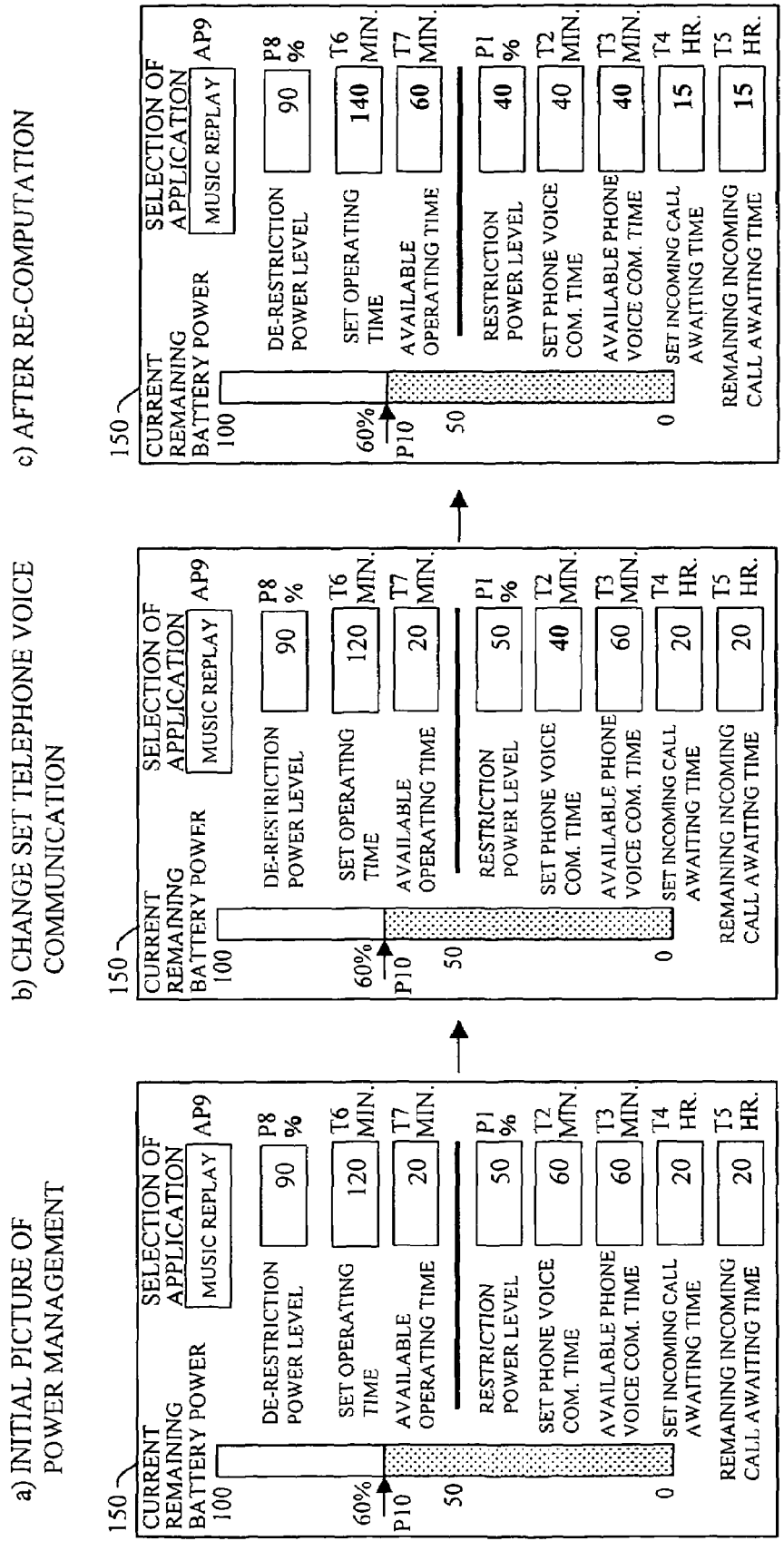

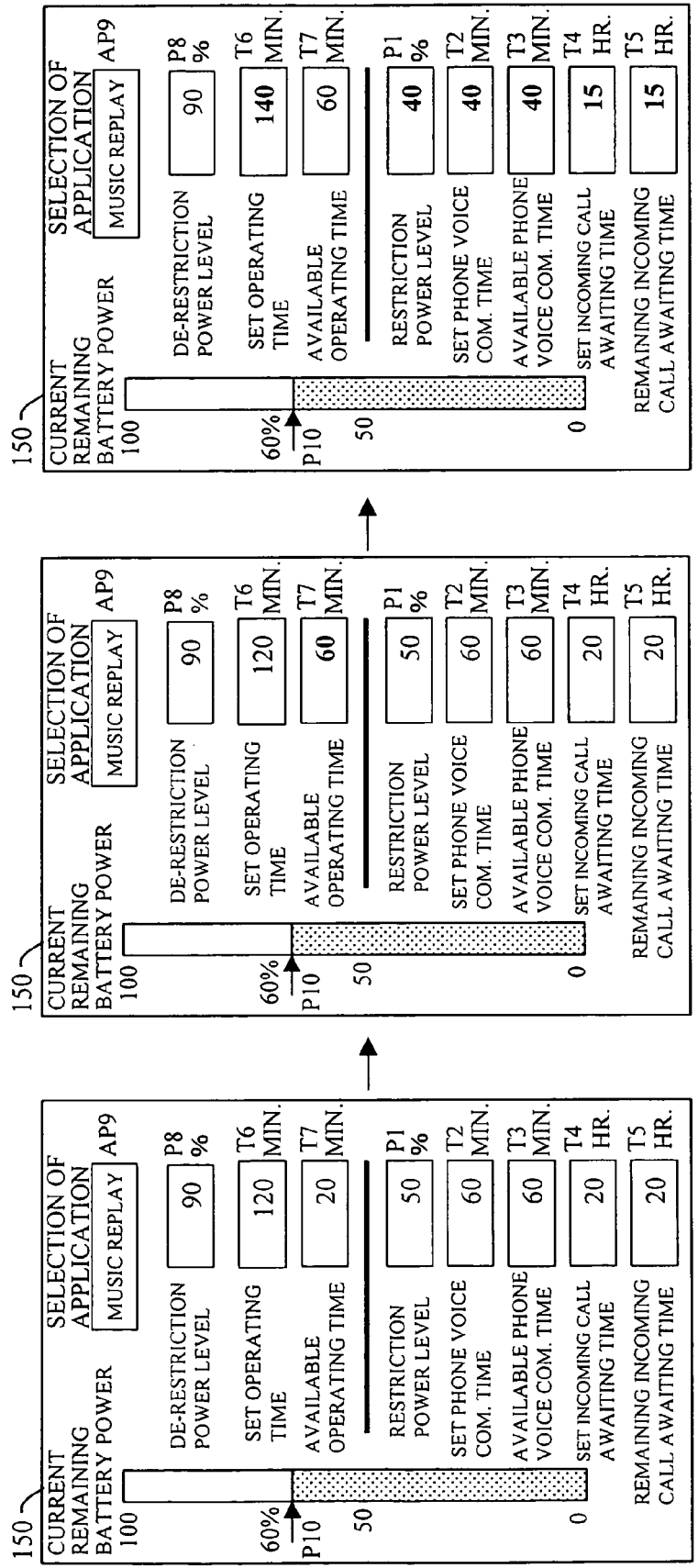

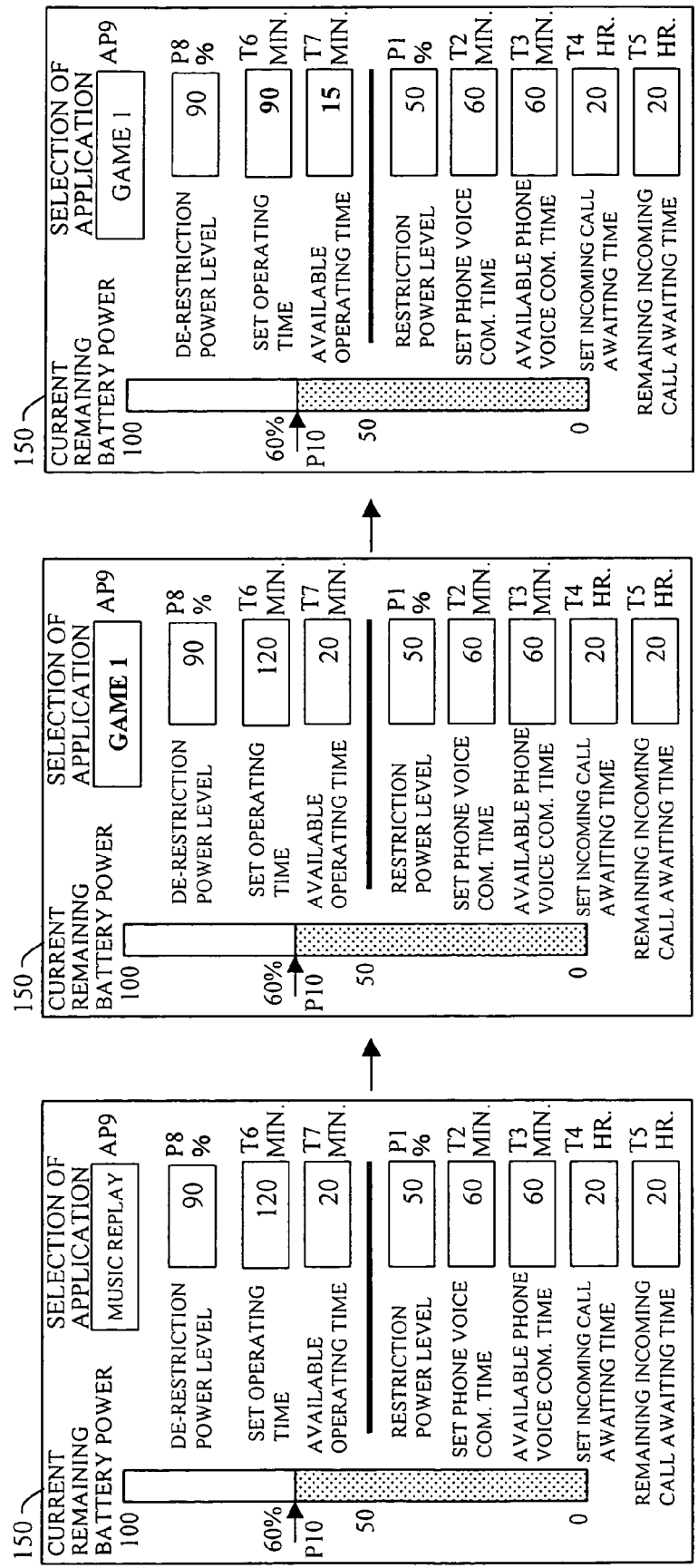

ELECTRONIC APPARATUS WITH RECHARGEABLE BATTERY

FIELD OF THE INVENTION

The present invention generally relates to an electronic apparatus with a rechargeable battery, and more particularly to such an electronic apparatus, such as a cellular phone, which can restrict or inhibit particular functions, e.g. a music replay function, other than major functions, such as the telephone function, in order to secure battery power required for the major functions.

BACKGROUND OF THE INVENTION

Mobile electronic apparatuses, such as cellular phones, PDAs (Personal Digital Assistants) and notebook personal computers (PCs), have rechargeable batteries. In a conventional cellular or mobile phone, applications consuming much power, such as music replay and video games, are frequently used in addition to major functions, such as genuine telephone functions of awaiting an incoming call and of making and receiving calls. Cellular phones are provided with a function to display or check on the amount of available remaining battery power, for power management of the cellular phones. When executing an application for music replay or game-playing on a cellular phone, a user should be careful of the remaining battery power, so that the incoming call awaiting and call making and receiving functions as the major functions of the cellular phone can be kept available.

A technology for accurately calculating the remaining battery capacity is available as "Impedance Track™" gas gauge technology from Texas Instruments.

Japanese Patent Application Publication JP 2000-253142-A published on Sep. 14, 2000 discloses power consumption reduction in a communication terminal device. In the communication terminal device, a remaining battery power is detected by a remaining battery power detecting unit, and a control unit compares the detected remaining battery power with a threshold value. If the control unit determines that the remaining power is lower than the threshold value, it disables supplementary functions, such as an incoming call indicator LED, a controller of incoming call indicating sound and a display, to thereby reduce power consumption. Thus the speech time or the incoming call awaiting time can be extended.

Japanese Patent Application Publication JP 2002-7002-A published on Jan. 11, 2002 discloses an electronic apparatus, which has a plurality of functions subject to power saving operation, and a power saving operation setting function to set priorities of such plural functions for the power saving operation.

Japanese Patent Application Publication JP 2002-199062-A (which corresponds to U.S. Patent Application Publication US 2002/0082059-A1) discloses a mobile terminal, which can reproduce data, such as music, stored therein. The mobile terminal is provided with battery charging state detecting means or remaining battery power detecting means, and allows starting of data reproduction when the start of charging the battery is detected, and prevents the data reproducing operation from being started when the remaining power of the battery is lower than a predetermined value. Thus, sound information is provided by desired music when the battery is in a charged state, and electric power can be saved when the remaining battery power is small.

SUMMARY OF THE INVENTION

In accordance with an aspect of the present invention, an electronic apparatus comprises an information processing unit, a memory coupled to the information processing unit, an RF communication unit coupled to the information processing unit, an audio circuit coupled to the information processing unit, a display, an input device, a secondary battery, and a detector detecting battery power remaining on the secondary battery. The information processing unit includes a power manager managing the power of the secondary battery, and has major functions and a supplementary function. The power manager initiates restriction of the supplementary functions, when present remaining battery power of the secondary battery as detected by the detector is below a predetermined threshold. The power manager computes one of the predetermined threshold for the secondary battery and a set operating time for the major functions from the remaining battery power at the predetermined threshold, in accordance with the other of the predetermined threshold for the secondary battery and the set operating time for the major functions from the remaining battery power at the predetermined threshold. The power manager computes an operating time available for the major functions and an operating time available for the supplementary function, in accordance with the remaining battery power of the secondary battery as detected by the detector and the remaining battery power at the predetermined threshold. The power manager displays, on the display, the present remaining battery power of the secondary battery, the predetermined threshold, the operating time available for the major functions and the operating time available for the supplementary function.

In accordance with another aspect of the present invention, the power manager generates a warning sound, when the present remaining battery power of the secondary battery as detected by the detector is below the predetermined threshold.

BRIEF DESCRIPTION OF THE DRAWINGS

FIGS. 9A, 9B and 9C show an example of how the display picture for power management changes when the restriction initiation remaining battery power level P1 is changed through the processing A of FIG. 7;

FIGS. 10A, 10B and 10C show another example of how the display picture for power management changes when the restriction initiation remaining battery power level P1 is changed through the processing A of FIG. 7;

FIGS. 11A, 11B and 11C show an example of how the power management picture changes when the set telephone voice communication time T2 is changed through the processing B of FIG. 7;

FIGS. 12A, 12B and 12C show an example of how the power management picture changes when the remaining available operating time T7 for a selected application is changed through the processing D of FIG. 7;

FIGS. 14A, 14B and 14C show an example of how the power management picture changes when the selected application AP9 is changed through the processing F of FIG. 7.

DESCRIPTION OF THE PREFERRED EMBODIMENTS

In known power management technologies for cellular phones, it sometimes happens that sufficient battery power for major functions of the cellular phone, such as the genuine telephone communication functions, cannot be secured, if a user does not monitor the remaining battery power.

The inventors have recognized that, in order to secure remaining sufficient battery power for major functions, such as the genuine telephone communication functions, of a cellular phone, it is effective to automatically restrict or inhibit operations of other supplementary functions.

An object of the present invention is to make it possible to secure sufficient remaining battery power preferentially for major functions of an electronic apparatus.

Another object of the invention is to make it possible to restrict operations of functions other than the major functions of the electronic apparatus when the remaining battery power decreases below a predetermined level.

According to the invention, sufficient remaining battery power can be secured preferentially for major functions of an electronic apparatus, and operations of functions other than the major functions of the electronic apparatus can be restricted when the remaining battery power decreases below a predetermined level.

The invention will be described in connection with non-limiting embodiments with reference to the accompanying drawings. Throughout the drawings, similar symbols and numerals indicate similar items and functions.

Figures 1A, 1B:
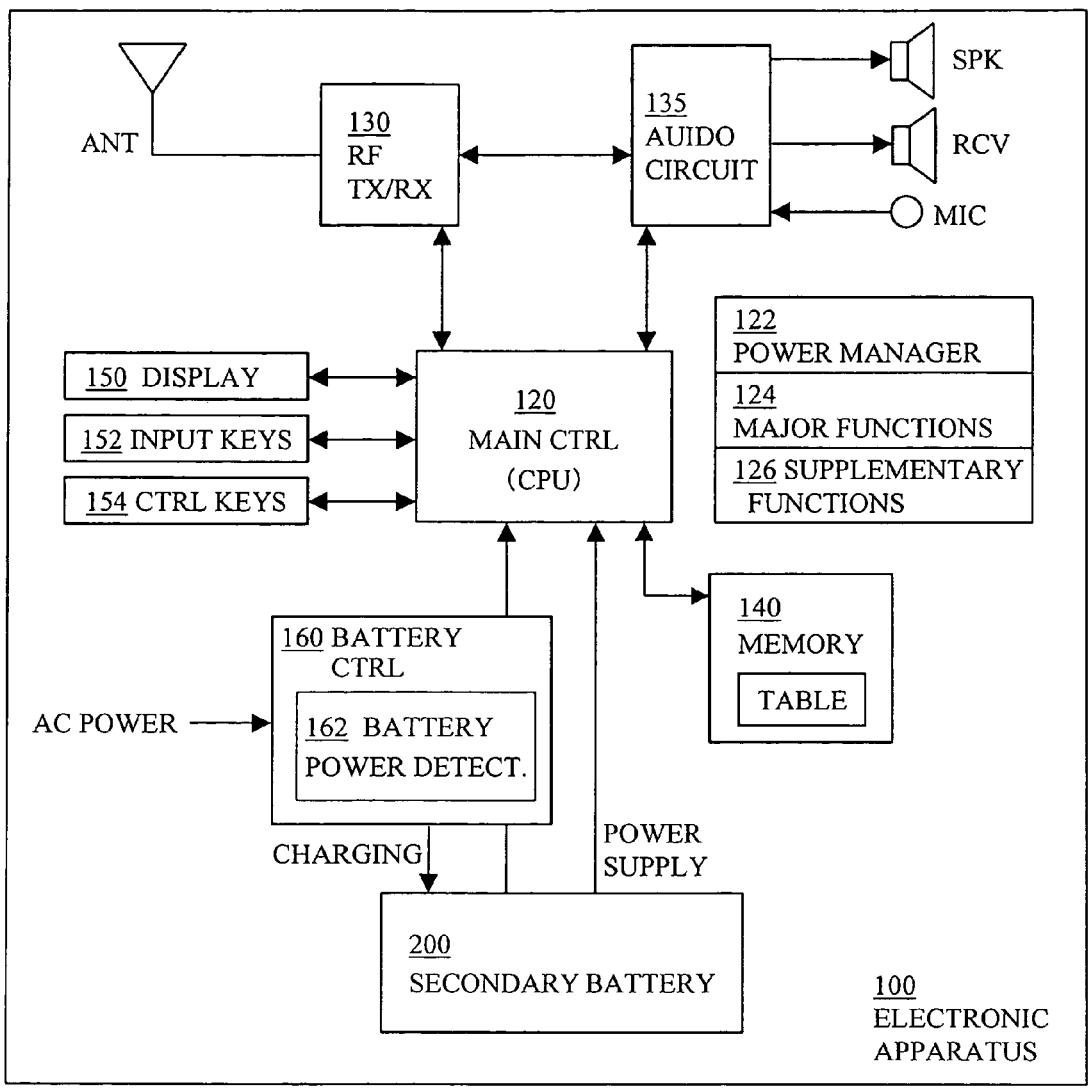
FIG. 1A shows a mobile electronic apparatus having a rechargeable secondary battery in accordance with an embodiment of the present invention.
FIG. 1B shows a table of different functions and their power consumptions to be stored in a memory.

FIG. 1A shows a mobile electronic apparatus 100, such as a cellular phone, having a rechargeable secondary battery in accordance with an embodiment of the present invention. FIG. 1B shows a table to be stored in a memory 140 of the mobile electronic apparatus 100, which represents a list of different functions and their power consumptions. These functions include major functions 124 indispensable for the telephone communications, such as the incoming call awaiting function and the call making and receiving functions for telephone voice communication, i.e. transmitting and receiving RF sound signals, and also include supplementary functions 126, such as utility applications, e.g. a music replay application, and a supplementary communication application, e.g. a video phone function.

The electronic apparatus 100 includes, a main control unit (CTRL) 120 such as a CPU, the memory 140, an RF transceiver (TX/RX) 130 for mobile telephone communications and coupled to an antenna ANT, an audio circuit 135 including a loudspeaker SPK, a receiver RCV and a microphone MIC, a display 150, input keys 152, control keys 154 including a confirmation key and a shift key, a battery control unit (CTRL) 160, and a secondary battery 200 coupled to the battery control unit 160. The components 130-160 are connected to the main control unit 120. The battery control unit 160 includes a remaining battery power detector unit 162. The main control unit 120 operates to control different functions of the electronic apparatus 100 in such a manner that operations of some of the functions should be allowed, restricted or de-restricted, in accordance with the remaining battery power capacity as detected by the remaining battery power detector unit 162, the table of the different functions and their power consumptions stored in the memory 140, and conditions for restricting the minor functions. The battery control unit 160, when it is connected to an external AC power supply, rectifies current from the external AC power supply to provide DC current and continues to operate to charge the secondary battery 200 in a fully charged state.

The electronic apparatus 100 further includes a power manager or management function 122 implemented on the main control unit 120, and has major functions 124, including an incoming call awaiting function, and a telephone voice communication function, i.e. call making and receiving functions, and has supplementary functions 126, including a video phone function, a Push-to-Talk-over-Cellular (PoC) function, an electronic mail function, a music replay function, and game functions (game 1 and game 2). The electronic mail function may be an additional one of the major functions 124. Part of these functions may be implemented in the form of hardware such as an LSI on the main control unit 120, and the other part may be implemented on the main control unit 120 in accordance with programs stored in the memory 140. The available operating times for these functions to dissipate particular remaining battery power are computed by an arithmetic operating section of the main control unit 120 or by the power manager 122 in accordance with the power consumptions of the respective functions shown in the table of FIG. 1B.

Figure 2:
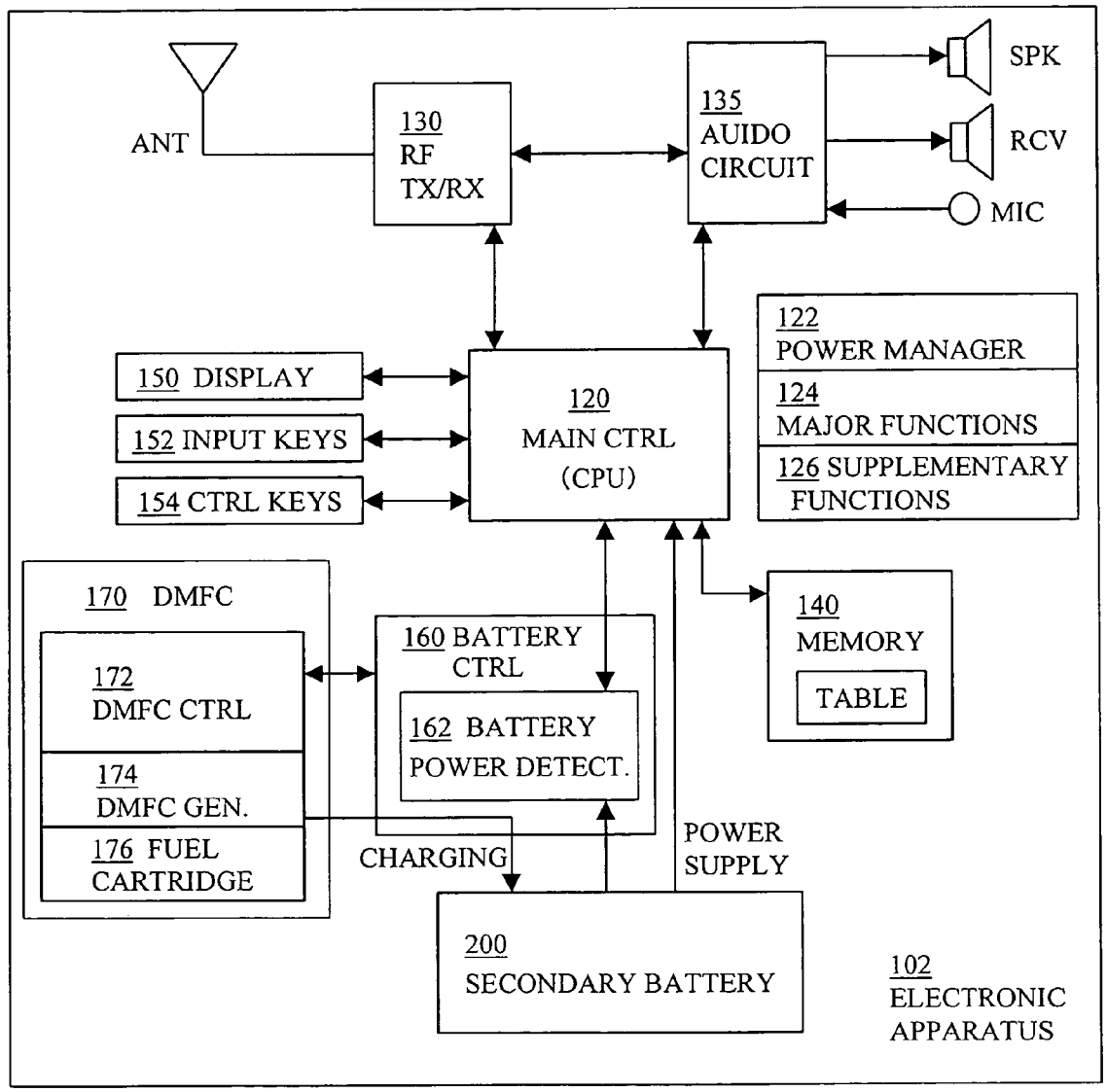
FIG. 2 shows a mobile electronic apparatus having a rechargeable secondary battery and a fuel cell, in accordance with another embodiment of the invention.

FIG. 2 shows a mobile electronic apparatus 102, such as a cellular phone, having a rechargeable secondary battery 200 and a direct methanol fuel cell (DMFC) 170, in accordance with another embodiment of the invention. In addition to the components 120-160 and 200 shown in FIG. 1A, the electronic apparatus 102 includes the fuel cell 170. The fuel cell 170 includes a DMFC control unit (CTRL) 172, a DMFC power generator unit 174 and a fuel cartridge 176, which are coupled to the battery control unit 160 and the secondary battery 200. The electronic apparatus 102 has the same functions as the electronic apparatus 100. The DMFC control unit 172 communicates with the battery control unit 160. The DMFC power generator unit 174 generates power through chemical reaction of methanol supplied from the fuel cartridge 176 under the control of the DMFC control unit 172, and operates to continuously charge the secondary battery 200 in a fully charged state through the battery control unit 160.

Figure 3A:
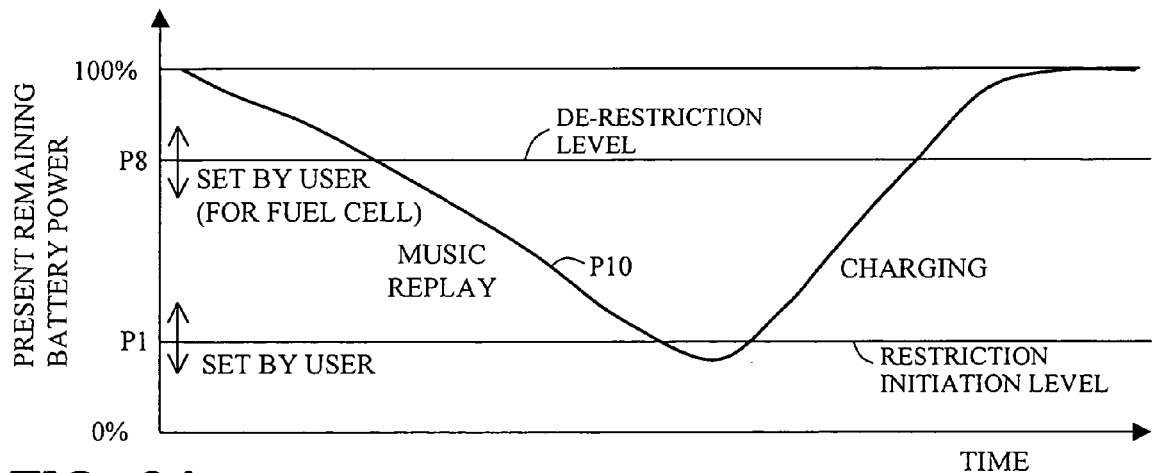
FIG. 3A is useful for explaining a principle of the invention, and illustrates the relationship between the remaining battery power of the secondary battery varying with time and the initiation of restriction and the de-restriction on the supplementary functions.
Figure 3B:
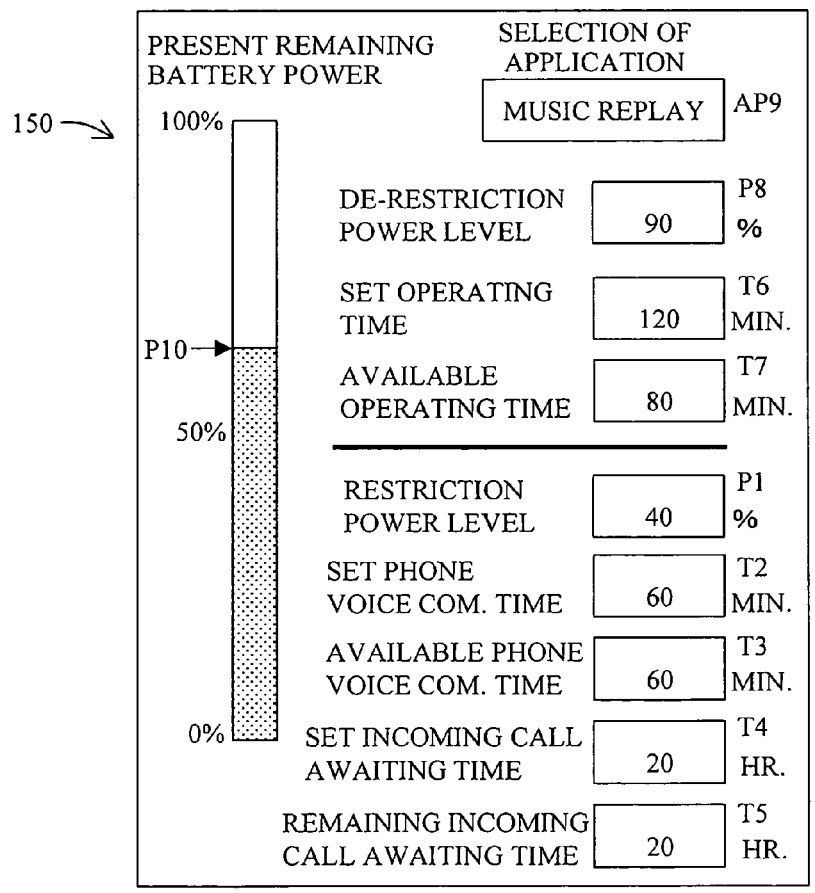
FIG. 3B shows an example of a display picture for use in power management, displayed on the display of the electronic apparatus shown in FIG. 1A.

FIG. 3A is useful for explaining a principle of the invention, and illustrates the relationship between the remaining battery power capacity of the secondary battery 200 varying with time and the initiation of restriction and the de-restriction or the termination of the restriction on the supplementary functions 126. FIG. 3B shows an example of a display picture for use in power management, displayed on the display 150 of the electronic apparatus 100 shown in FIG. 1A.

Referring to FIG. 3A, a present or current remaining battery power P10 of the secondary battery 200 as detected by the remaining battery power detector unit 162 gradually decreases due to power consumption by various functions in operation, such as the music replay function and/or the incoming call awaiting function, of the mobile electronic apparatus 100 or 102. The initial remaining battery power P10 is in a full or 100% state, and none of the functions 124 and 126 of the mobile electronic apparatus 100 or 102 is restricted or inhibited. When the present remaining battery power P10 decreases to a remaining battery power level P1 set by a user at which the restriction or inhibition of functions is to be initiated, the power manager 122 allows only the major functions 124 of the electronic apparatus 100 or 102 to operate, and starts to restrict or inhibit the operations of the supplementary functions 126. If the supplementary functions 126 are restricted while one or more of them are currently enabled or operating, they should be immediately disabled, or the electronic apparatus 100 or 102 gives a warning. When the present remaining battery power P10 through charging rises to exceed a battery power level P8 set by the user, the main control unit 120 de-restricts the operations of the supplementary functions 126 and allows all of the functions including the supplementary functions 126 to operate or be enabled.

While the shell of the cellular phone is closed and only the incoming call awaiting function, for example, which is one of the major functions 124 of the electronic apparatus 100 or 102, is enabled, with the present remaining battery power P10 gradually decreased to the restriction initiation remaining battery power level P1, the electronic apparatus 100 or 102 may be controlled by the power manager 122 in such a manner that at least one of the remaining battery power detector unit 162, an LED backlight and a vibrator is disabled, and, in addition, a time period during which a ring signal should be generated by a telephone answering service as one of the major functions 124 may be shortened, whereby consumption of the battery power can be reduced.

Referring to FIG. 3B, in the power management picture displayed on the display 150, there are displayed the restriction initiation remaining battery power level P1 (%) set by the user, at which the restriction or inhibition of the supplementary functions 126 is to be initiated, a minimum time T2 (minutes) for telephone voice communication that is set by the user for securing the telephone voice communication function as one of the major functions 124, a remaining, currently available time T3 (minutes) for telephone voice communication within the limit of the set telephone voice communication time T2, a minimum incoming call awaiting time T4 (hours) set by the user for securing the incoming call awaiting function, which is one of the major functions 124, a present or current remaining incoming call awaiting time T5 (hours) within the limit of the set incoming call awaiting time T4, a set operating time T6 (minutes) for which an application AP9 selected from the supplementary functions 126 can operate from the battery power difference between the set battery power capacity levels P8 and P1 for initiating the de-restriction and the restriction, respectively, a remaining available operating time T7 (minutes), for which such an application AP9 can operate from the present remaining battery power, within the limit of the set operating time length T6, the remaining battery power P8 (%) set by the user at which the supplementary functions 126 are to be de-restricted, a type or identification AP9 of an application selected by the user, and the present remaining battery power P10 (%) of the secondary battery 200 as detected by the detector unit 162. The present remaining battery power P10 of the secondary battery 200 is displayed in the form of a percentile bar in the left portion of the power management display picture.

The set application operating time T6 is the time for which the selected application AP9 can operate continuously until the present remaining battery power P10, when it is equal to the remaining battery power P8, at which the de-restriction is initiated, reaches the level of the remaining battery power P1, at which the restriction of the supplementary functions 126 is initiated. Typically, users scarcely pay attention to the remaining battery power P8, at which the de-restriction is initiated, and the set operating time T6 indicating the operating time available from the de-restriction remaining battery power P8, and hence the set operating time T6 and the de-restriction initiation remaining battery power P8 may not be indicated on the display 150.

Through the input keys 152 and the control keys 154, the user sets the remaining battery power P1 (%) at which the supplementary functions 126 are to be restricted, the set, minimum telephone voice communication time T2 (minutes) to be secured, the set, minimum incoming call awaiting time T4 to be secured, the remaining available operating time T7 for which the application AP9 can operate, and the remaining battery power P8 at which the supplementary functions 126 are to be de-restricted. The type AP9 of the selected application AP9 is indicated as being selected by the user through the input keys 152 and the control keys 154.

Figure 4:
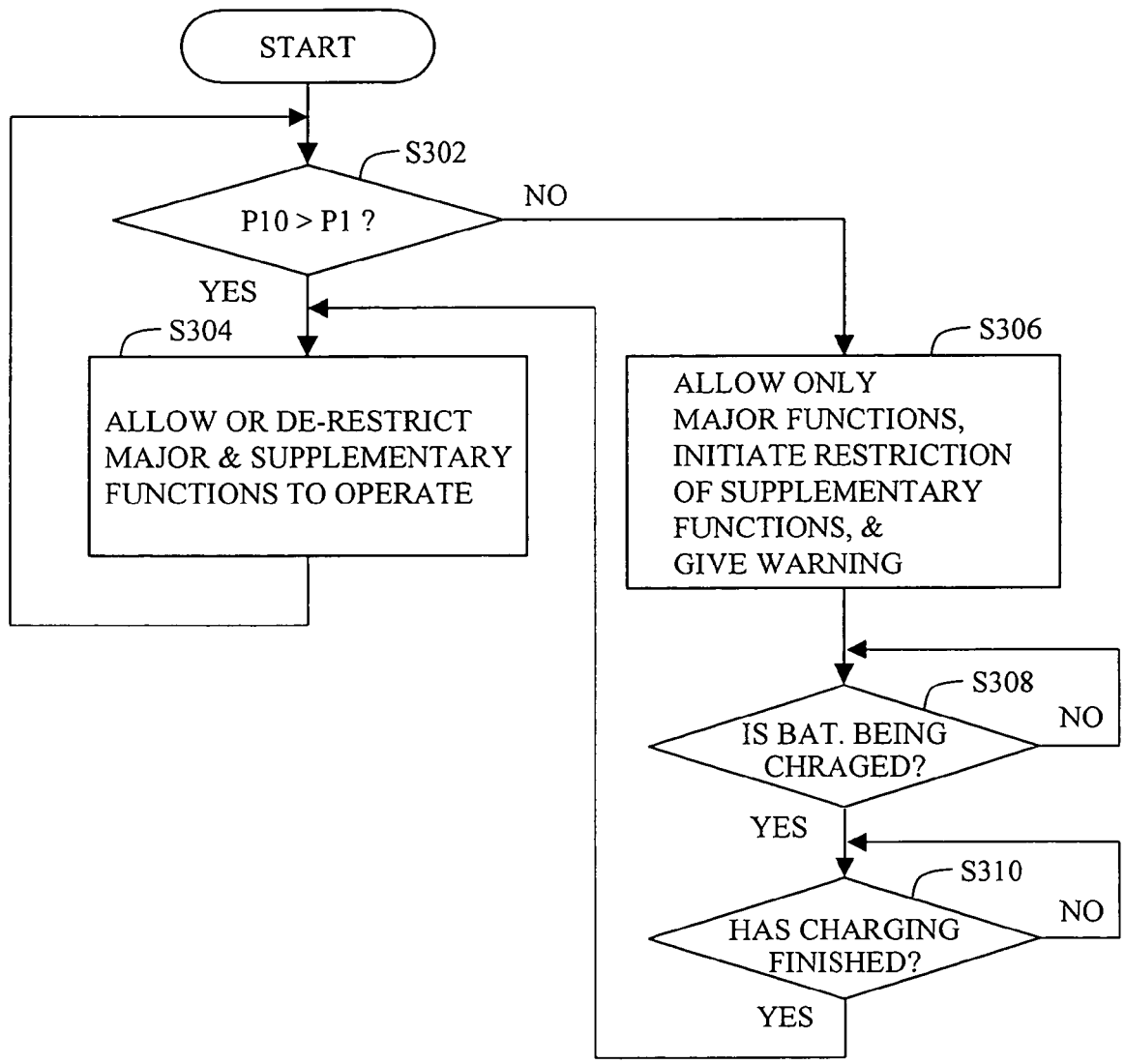
FIG. 4 is a flow chart of the restriction of the supplementary functions that is executed by the power manager of the main control unit of the electronic apparatus of FIG. 1A.

FIG. 4 is a flow chart of the restriction or inhibition of the operations of the supplementary functions 126 that is executed by the power manager 122 of the main control unit 120 of the electronic apparatus 100 of FIG. 1A.

At Step 302, the power manager 122 compares the present remaining battery power P10 with the remaining battery power P1, at which the restriction of the supplementary functions 126 is to be initiated, to thereby determine whether or not the present remaining battery power P10 is larger than the restriction initiation remaining battery power P1. If it is determined that the present remaining battery power P10 is larger than the restriction initiation remaining battery power P1, the power manager 122 at Step 304 allows both the major functions 124 and the supplementary functions 126 to operate or be enabled. As long as the present remaining battery power P10 is larger than the restriction initiation battery power P1, Steps 302-304 are executed repeatedly.

If it is determined at Step 302 that the present remaining battery power P10 is not larger than the restriction initiation remaining battery power P1, the power manager 122 at Step 306 initiates the restriction of the supplementary functions 126 and causes the audio circuit 135 and the loudspeaker SPK to give a warning, in the form of synthetic sound announcement or warning sound, informing that the present remaining battery power P10 is not larger than the restriction initiation remaining battery power P1 or that the supplementary functions 126 are currently unavailable, while allowing only the major functions 124 to be enabled. Alternatively, at Step 306, the power manager 122 may not restrict the supplementary functions 126, but simply may give a warning through the audio circuit 135 and the loudspeaker SPK that the present remaining battery power P10 is not greater than the restriction initiation remaining battery power P1 or that the supplementary functions 126 are currently unavailable, while allowing the major functions 124 and the supplementary functions 126 to be operable.

At Step 308, the power manager 122 makes inquiries of the battery control unit 120 to determine whether the secondary battery 200 is currently being charged. The power manager 122 executes Step 308 repeatedly until the charging is started. If it is determined that the secondary battery 200 is being charged, the power manager 122 at Step 310 makes a determination whether the charging of the secondary battery 200 has been completed so that the predetermined remaining battery power level has been attained, i.e. whether P10=100%. If it is determined that the charging has finished, the procedure returns to Step 304, and the execution of Step 310 is repeated until the charging finishes. In this manner, the supplementary functions 126 are restricted or inhibited depending on the remaining battery power level P10 of the secondary battery 200 and the restriction initiation remaining battery power level P1.

Figure 5:
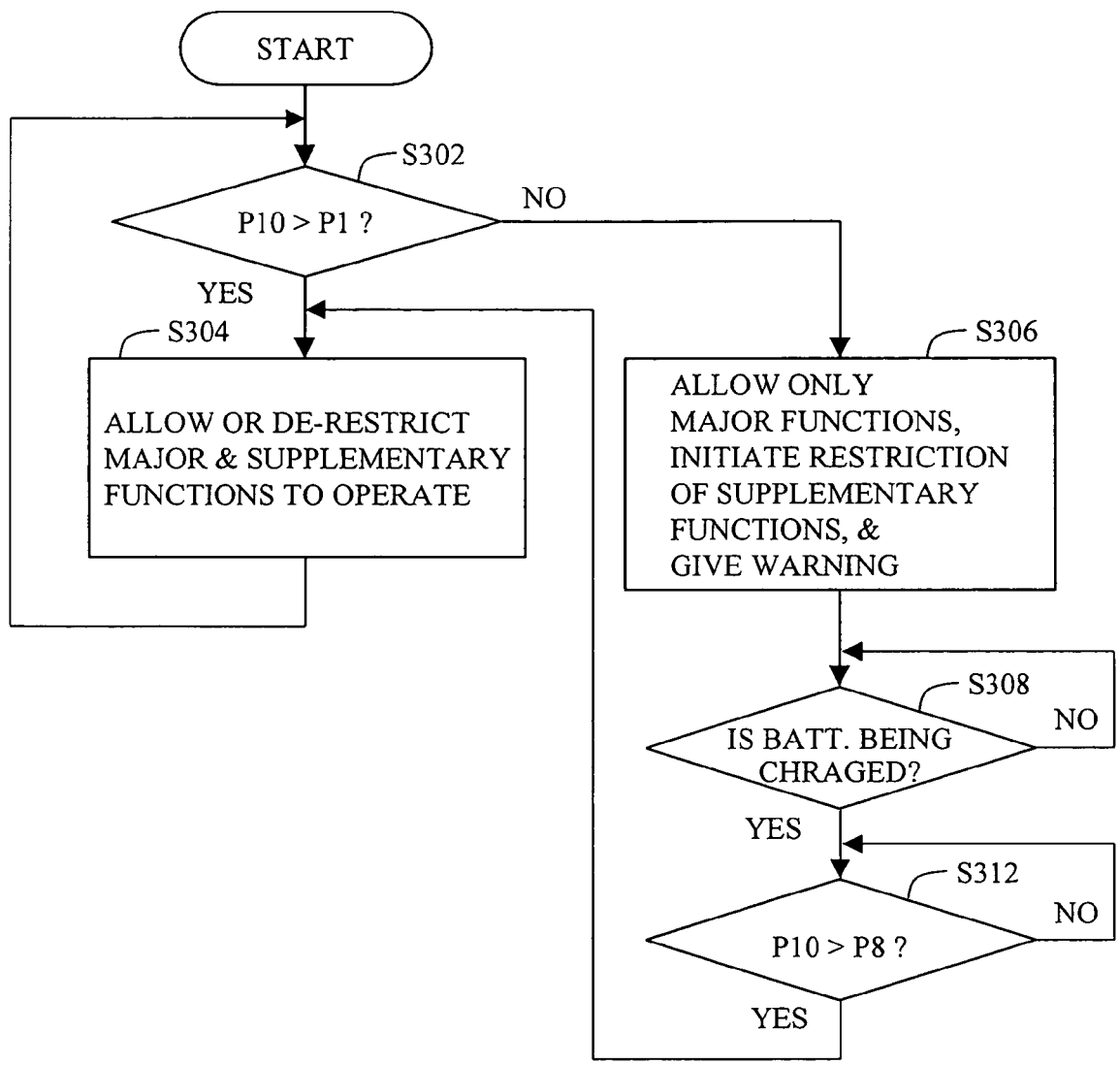
FIG. 5 is another flow chart of the restriction of the supplementary functions that is executed by the power manager of the main control unit of the electronic apparatus of FIG. 1A or 2.

FIG. 5 is another flow chart of the restriction or inhibition of the operations of the supplementary functions 126 that is executed by the power manager 122 of the main control unit 120 of the electronic apparatus 100 or 102 of FIG. 1A or 2. Steps 302-308 are similar to those shown in FIG. 4 and described with reference to FIG. 4.

At Step 312, the power manager 122 determines whether the present remaining battery power P10 of the secondary battery 200 has reached the remaining battery power level P8 (e.g. P10=90%) at which the supplementary functions 126 are to be de-restricted. If it is determined that the present remaining battery power P10 has reached the battery power level P8 for de-restricting the supplementary functions 126, the procedure returns to Step 304. Step 310 is executed repeatedly until the present remaining battery power P10 reaches the remaining battery power level P8 for de-restricting the supplementary functions 126.

Figure 6:
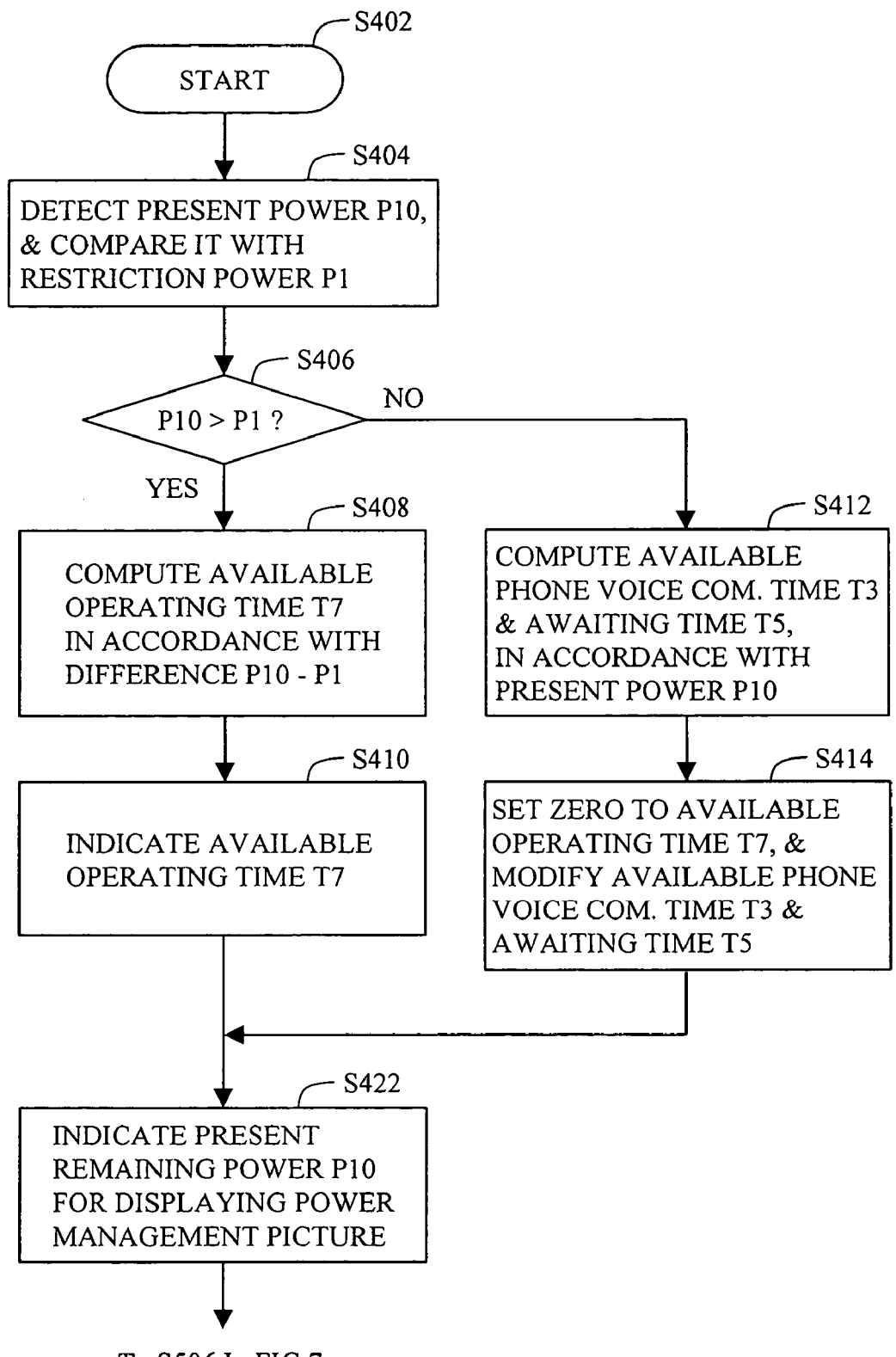
FIGS. 6 and 7 show a flow chart of processing for power management of the functions of the mobile electronic apparatus that is executed by the power manager of the main control unit.
Figure 7:
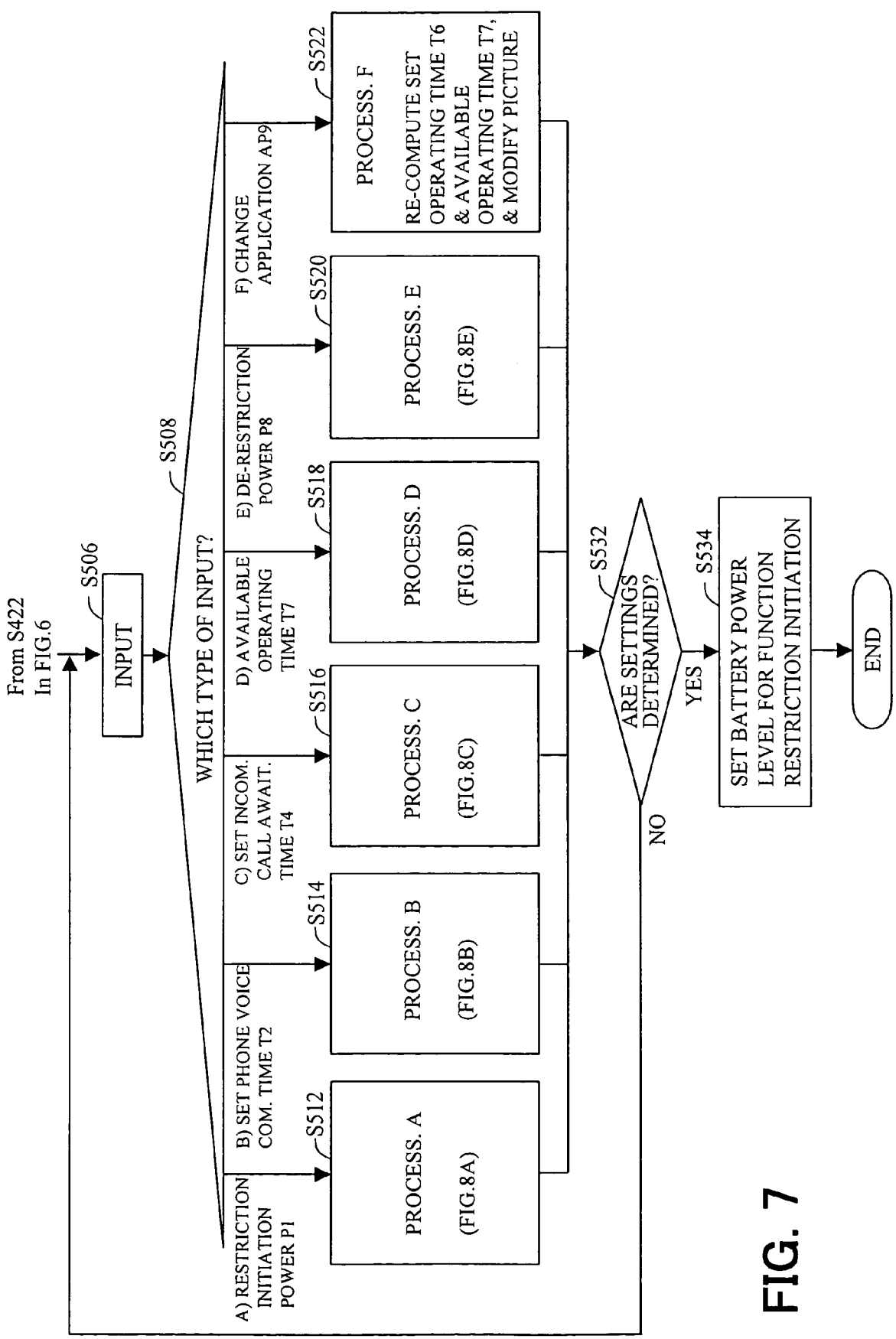

FIGS. 6 and 7 show a flow chart of processing for power management of the functions of the mobile electronic apparatus 100 or 102 that is executed by the power manager 122 of the main control unit 120. FIGS. 8A through 8E show respectively flow charts in detail of the processing A through E shown in FIG. 7.

Referring to FIG. 6, when the mobile electronic apparatus 100 or 102 activates the processing for displaying the picture for power management done by the power manager 122, the power manager 122 at Step 402 starts processing for displaying the state of power management. At Step 404, the power manager 122 causes the remaining battery power detector unit 162 to detect the present remaining battery power P10, takes in the present remaining battery power P10, and compares the present remaining battery power P10 with the restriction initiation remaining battery power P1 at which the function restriction is to be initiated.

At Step 406, the power manager 122 determines whether the present remaining battery power P10 is larger than the restriction initiation remaining battery power P1. If it is determined that the present remaining battery power P10 is larger than the restriction initiation remaining battery power P1 (i.e. P10>P1), the power manager 122 at Step 408 computes, in accordance with the present remaining battery power P10 and the power consumption of the selected application AP9 indicated in the table, the remaining available operating time T7 for which the selected application AP9 can operate from the battery power difference calculated by subtracting the restriction initiation remaining battery power P1 from the present remaining battery power P10 (P10-P1), and indicates the remaining available operating time T7 at Step 410. At Step 422, the power manager 122 causes the present remaining battery power P10 to be indicated for displaying the power management picture as shown in FIG. 3B. After that, the procedure proceeds to Step 506 in FIG. 7.

If it is determined at Step 406 that the present remaining battery power P10 is not larger than the restriction initiation remaining battery power P1 (i.e. P10<P1), the power manager 122 at Step 412 computes the remaining available telephone voice communication time T3 and the present remaining incoming call awaiting time T5 which are available from the present remaining battery power P10, determines at Step 414 that the remaining available operating time T7 for which the application AP9 can operate should be zero (0) minutes, and modifies the display picture of the remaining available telephone voice communication time T3 and the present remaining incoming call awaiting time T5 in accordance with the result of the computation. After that, the procedure proceeds to Step 422. Thereafter, the procedure proceeds to Step 506 shown in FIG. 7.

Now, referring to FIG. 7, the power manager 122 at Step 506 receives input information which is inputted or set by the user through the input keys 152 and the control keys 154. At Step 508, the power manager 122 determines which type the user input information is of. If it is determined that the user input information is the restriction initiation remaining battery power level P1, the procedure proceeds to Step 512 (FIG. 8A) where the processing A is executed. If it is determined that the user input information is the set telephone voice communication time T2, the procedure proceeds to Step 514 (FIG. 8B) where the processing B is executed. If it is determined that the user input information is the set incoming call awaiting time T4, the procedure proceeds to Step 516 (FIG. 8C), where the processing C is to be executed. If it is determined that the user input information is determined to be the remaining available operating time T7 available for the application AP9, the procedure proceeds to Step 518 (FIG. 8D), where the processing D is to be executed. If it is determined that the user input information is the remaining battery power level P8 for the function de-restriction, the procedure proceeds to Step 520 (FIG. 8E), where the processing E is to be executed. If it is determined that the user input information is the change of the application AP9, the procedure proceeds to Step 522, where the processing F is to be executed.

Figure 8A:
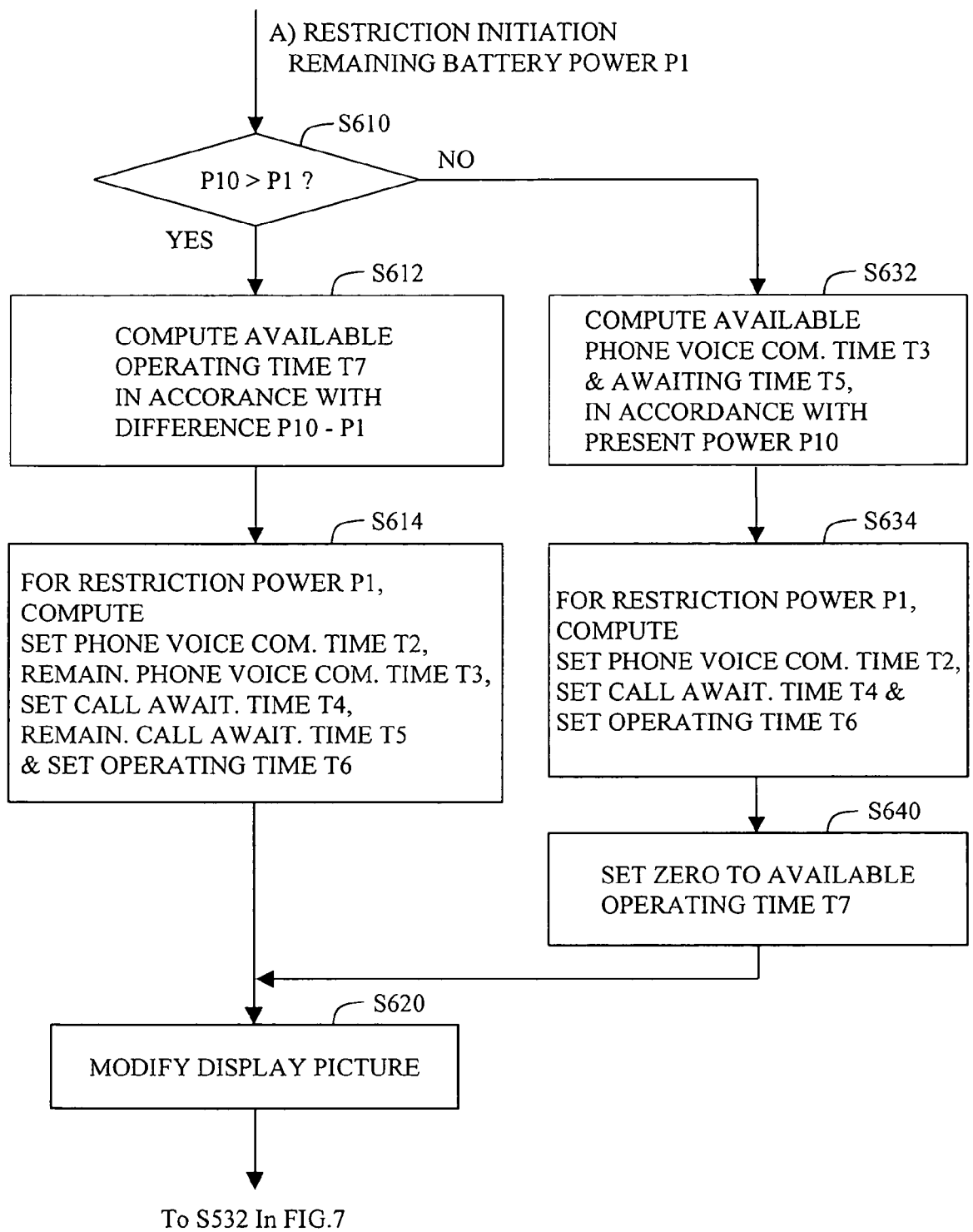
FIGS. 8A through 8E show respective flow charts in detail of the processing A through E shown in FIG. 7.

Referring to FIG. 8A, the power manager 122 at Step 610 compares the present remaining battery power P10 with the set or changed restriction initiation remaining battery power level P1, to determine if the present remaining battery power P10 is larger than the restriction initiation remaining battery power P1. If it is determined that the present remaining battery power P10 is larger than the restriction initiation remaining battery power P1 (i.e. if P10>P1), the power manager 122 at Step 612 computes the remaining available operating time T7 for which the application AP9 can operate from the battery power difference which is obtained by subtracting the restriction initiation remaining battery power P1 from the present remaining battery power P10 (i.e. P10-P1), and in accordance with the power consumption of the application AP9 shown in the table of FIG. 1B. At Step 614, the power manager 122 computes, in accordance with the set or changed restriction initiation remaining battery power P1 and the power consumptions of the telephone voice communication function and the incoming call awaiting function contained in the table, the corresponding set telephone voice communication time T2, the remaining available telephone voice communication time T3 within the limit of the set telephone voice communication time T2, the corresponding set incoming call awaiting time T4, and the present remaining incoming call awaiting time T5 within the limit of the set incoming call awaiting time T4. Also, the power manager 122 computes the set application operating time T6 in accordance with the battery power difference between the remaining battery power P8 at which the supplementary functions 126 are to be de-restricted and the restriction initiation remaining battery power P1 at which the restriction of the supplementary functions 126 is to be initiated (P10-P1), and in accordance with the power consumption of the application AP9 as one of the supplementary functions 126. At Step 620, the power manager 122 modifies the power management display picture as shown in FIG. 3B. After that, the procedure proceeds to Step 532 in FIG. 7.

If it is determined at Step 610 that the present remaining battery power P10 is not larger than the restriction initiation remaining battery power P1 (i.e. P10<P1), the power manager 122 at Step 632 computes the currently available remaining telephone voice communication time T3 and the present remaining incoming call awaiting time T5, in accordance with the present remaining battery power P10 and with the power consumptions of the incoming call awaiting and telephone voice communication functions shown in the table. At Step 634, the power manager 122 computes the set telephone voice communication time T2 and the set incoming call awaiting time T4, and further computes the corresponding set application operating time T6 for the application AP9 in accordance with the battery power difference between the de-restriction remaining battery power P8 and the restriction initiation remaining battery power P1 (P8-P1), and with the power consumption of the application AP9. At Step 640, the power manager 122 determines that the remaining available operating time T7 for the application AP9 should be zero (0) minutes. After that, the procedure proceeds to Step 620, and then to Step 532 in FIG. 7.

Figure 8B:
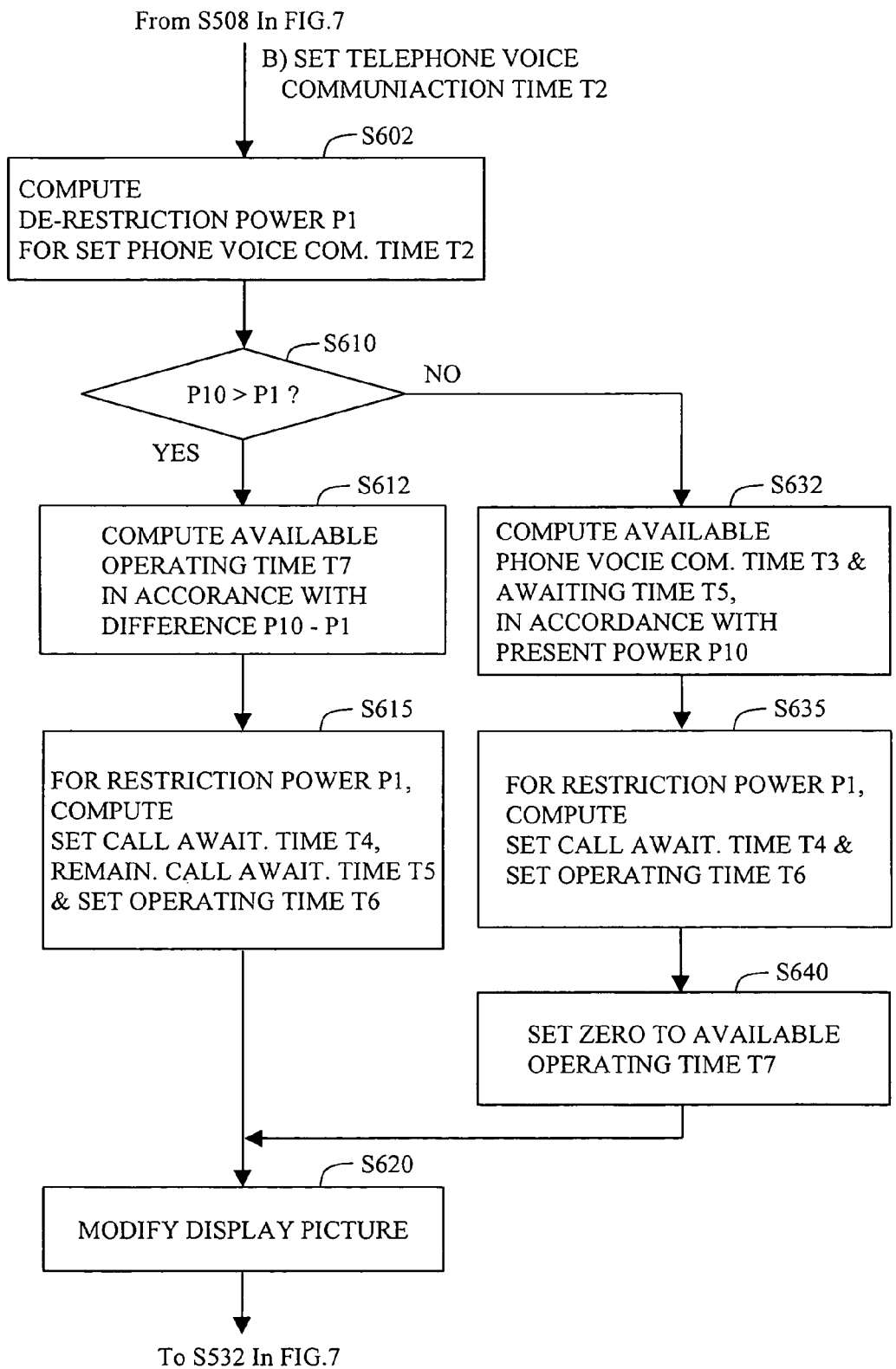

Referring to FIG. 8B, at Step 602, the power manager 122 computes the function restriction initiation remaining battery power P1, in accordance with the set or changed telephone voice communication time T2 and with the power consumption of the telephone voice communication function. Steps 610, 632, 640 and 620 are similar to those shown in FIG. 8A, and hence are not described again.

At Step 615, the power manager 122 computes the set incoming call awaiting time T4 and the present remaining incoming call awaiting time T5, in accordance with the computed restriction initiation remaining battery power P1 and with the power consumption of the incoming call awaiting function, and also computes the corresponding set operating time T6 for the application AP9 in accordance with the battery power difference between the de-restriction remaining battery power P8 and the computed restriction initiation remaining battery power P1 (P8-P1), and with the At Step 635, the power manager 122 similarly computes the corresponding set incoming call awaiting time T4 and the corresponding set operating time T6 for the application AP9 in accordance with the restriction initiation remaining battery power P1, the de-restriction remaining battery power P8 and the power consumptions of the incoming call awaiting function and the application AP9.

Figure 8C:
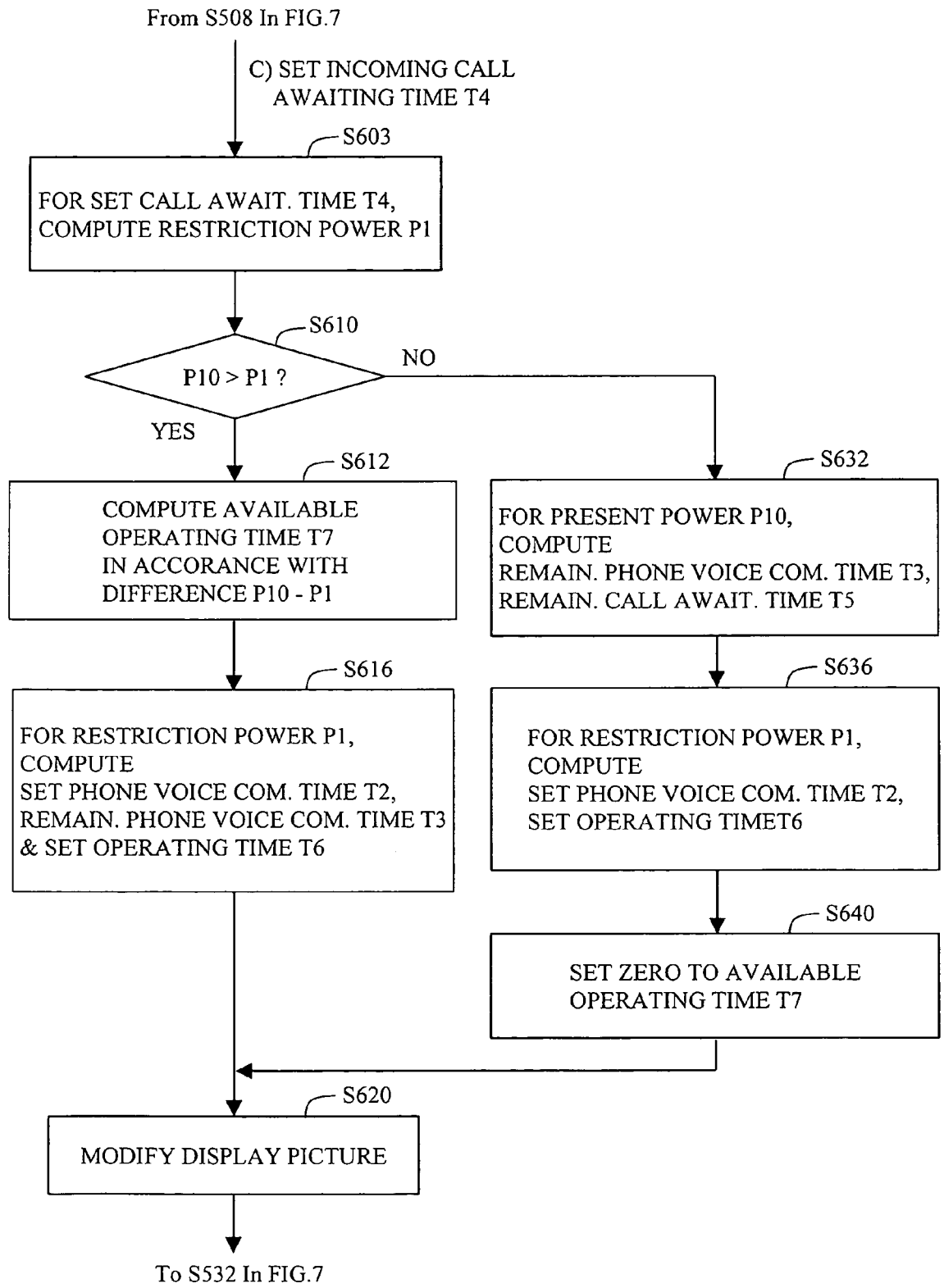

Referring to FIG. 8C, at Step 603, the power manager 122 computes, in accordance with the set or changed incoming call awaiting time T4 and the power consumption of the incoming call awaiting function, the corresponding restriction initiation remaining battery power P1. Steps 610, 620, 632 and 640 are similar to those shown in FIG. 8A.

At Step 616, the power manager 122 similarly computes the corresponding set telephone voice communication time T2, the remaining telephone voice communication time T3, and the corresponding set operating time T6 for the application AP9 in accordance with the computed restriction initiation remaining battery power P1, the de-restriction remaining battery power P8, and the power consumptions of the telephone voice communication function and the application AP9.

At Step 636, the power manager 122 similarly computes the corresponding set telephone voice communication time T2 and the corresponding set operating time T6 for the application AP9 in accordance with the computed restriction initiation remaining battery power P1, the de-restriction remaining battery power P8, and the power consumptions of the telephone voice communication function and the application AP9.

Figure 8D:
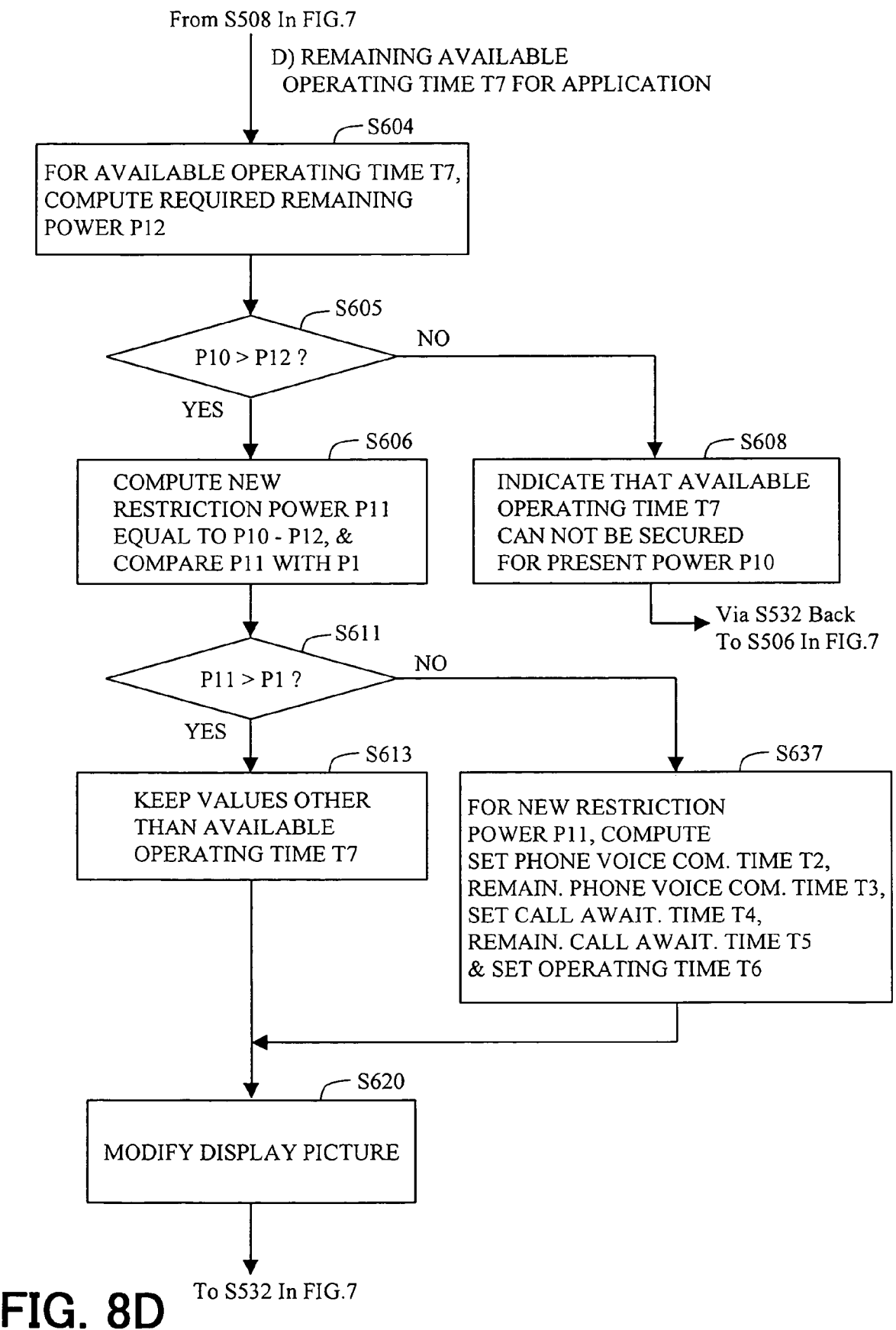

Referring to FIG. 8D, at Step 604, the power manager 122 computes required remaining battery power P12 (%) required for the application AP9 to operate, in accordance with the user input or changed remaining available operating time T7 for the set application AP9 and the power consumption of the application AP9 contained in the table, and compares the present remaining battery power P10 with the required remaining battery power P12. At Step 605, the power manager 122 determines whether the present remaining battery power P10 is larger than the required remaining battery power P12 (i.e. whether P10>P12). If it is determined that the present remaining battery power P10 is not larger than the required remaining battery power P12, the power manager 122 at Step 608 indicates that the present remaining battery power P10 cannot secure the remaining available operating time T7 for the application AP9. After that, the procedure proceeds to Step 532 and then returns to Step 506 in FIG. 7.

If it is determined at Step 605 that the present remaining battery power P10 is larger than the required remaining battery power P12 (i.e. if P10>P12), the power manager 122 at Step 606 computes new restriction initiation remaining battery power P11 which is equal to the battery power difference obtained by subtracting the required remaining battery power P12 from the present remaining battery power P10 (P10-P12), and compares the new restriction initiation remaining battery power P11 with the original restriction initiation remaining battery power P1. At Step 611, the power manager 122 determines whether the new restriction initiation remaining battery power P11 is larger than the original restriction initiation remaining battery power P1 (i.e. whether P11>P1). If it is determined that the new restriction initiation remaining battery power P11 is larger than the original restriction initiation remaining battery power P1, the power manager 122 at Step 613 keeps present values other than the remaining available operating time T7 for the application AP9. After that, the procedure proceeds to Step 620. Step 620 is similar to that shown in FIG. 8A. Thereafter, the procedure proceeds to Step 532 in FIG. 7.

If it is determined at Step 611 that the new restriction initiation remaining battery power P11 is not larger than the original restriction initiation remaining battery power P1, the power manager 122 at Step 637 similarly computes, in accordance with the new restriction initiation remaining battery power P1=P11, the set telephone voice communication time T2, the remaining available telephone voice communication time T3, the set incoming call awaiting time T4, the present remaining available incoming call awaiting time T5, and the set operating time T6 for the application AP9. After that, the procedure proceeds to Step 620, and then to Step 532 in FIG. 7.

Figure 8E:
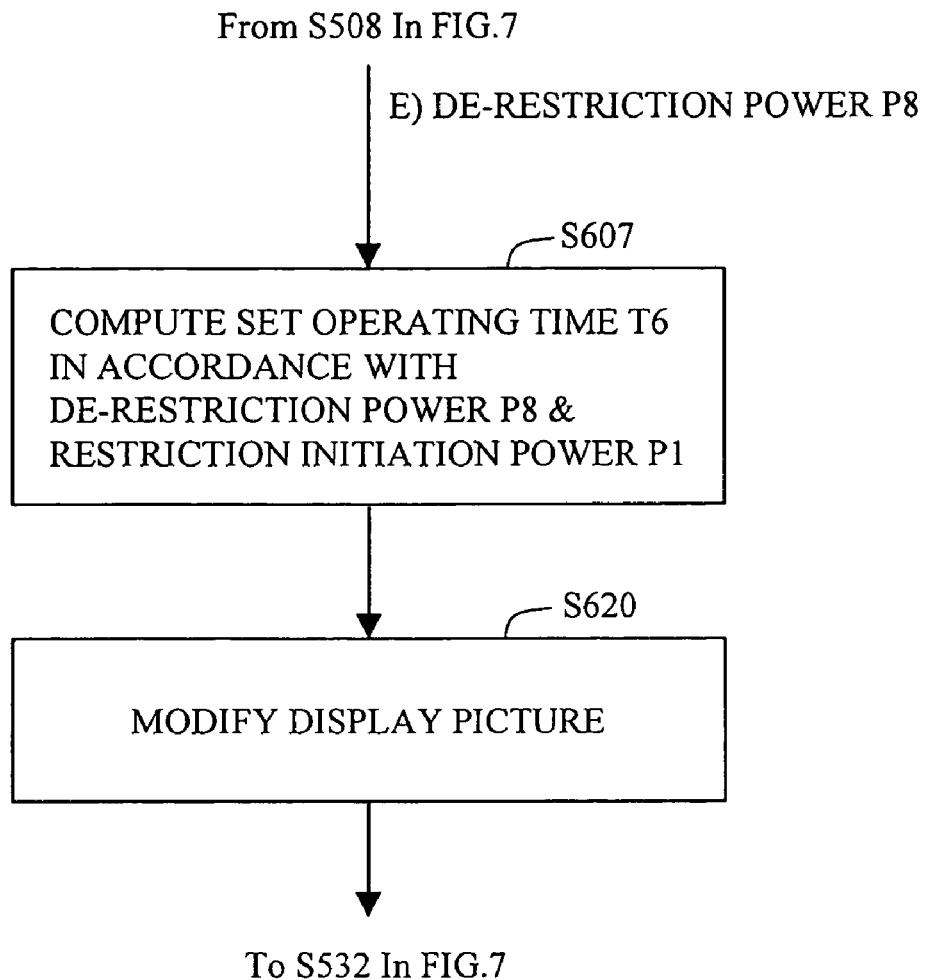

Referring now to FIG. 8E, at Step 607, the power manager 122 computes the set operating time T6 for the application AP9, in accordance with the battery power difference between the set or changed de-restriction remaining battery power P8 and the restriction initiation remaining battery power P1 (P8-P1), and with the power consumption of the application AP9 in the table. After that the procedure proceeds to Step 620, and then to Step 532 in FIG. 7.

Referring back to FIG. 7, at Step 522, the power manager 122 computes the set operating time T6 for the application AP9 and the remaining available operating time T7, in accordance with the set or changed application AP9, the power consumption of the application AP in the table, and the battery power difference between the de-restriction remaining battery power P8 and the restriction initiation remaining battery power P1 (P8-P1). The power manager 122 modifies the power management display picture similarly to Step 620 in FIG. 8A. After that, the procedure proceeds to Step 532.

At Step 532, the power manager 122 determines whether the user determines the power management settings of the picture as currently displayed on the display 150. If it is determined that the user has determined the settings, the power manager 122 at Step 534 performs the power management of the mobile electronic apparatus 100 or 102 in accordance with the set or changed restriction initiation remaining battery power P1 or the like. If it is determined that the user has not or cannot determined the settings, the procedure returns to Step 506.

FIGS. 9A, 9B and 9C show an example of how the display picture for power management changes when the restriction initiation remaining battery power P1 is changed through the processing A at Step 512 of FIG. 7. When the processing to display the power management picture is called through the operation of the input keys 152 and the control keys 154 by the user (Step 402 in FIG. 6), the display 150 displays the initial picture for the power management shown in FIG. 9A showing the present state of the power management (Steps 410, 414 and 422). In this example, the present remaining battery power P10 is 60%. The restriction initiation remaining battery power P1 has been set to be 50% of the fully charged state. Then, the user uses the input keys 152 and the control keys 154 to change the restriction initiation remaining battery power P1 to 40% in order to decrease the restriction initiation remaining battery power level, for example, as shown in FIG. 9B, which shows the change of the restriction initiation remaining battery power P1. Then, the processing A (FIG. 8A) at Step 512 shown in FIG. 7 is executed, and, as shown in the display picture after the re-computation in FIG. 9C, it changes the displayed values of the set telephone voice communication time T2, the remaining available telephone voice communication time T3, the set incoming call awaiting time T4, the present remaining incoming call awaiting time T5, the set application operating time T6 for the application AP9, and the remaining available operating time T7 for the application AP9.

FIGS. 10A, 10B and 10C show another example of changes of the power management picture with the restriction initiation remaining battery power P1 changed through the processing A at Step 512 of FIG. 7. When the processing to display the power management picture is called by the user, the display 150 displays the initial picture for the power management shown in FIG. 10A showing the present state of the power management. In this example, the present remaining battery power P10 is 40%. The remaining available operating time T7 for the application AP9 is zero (0) minutes. The restriction initiation remaining battery power P1 is set to be 50% of the fully charged state. The user uses the input keys 152 and the control keys 154 to, for example, change the restriction initiation remaining battery power P1 to 40% in order to lower the level at which the function restriction is initiated, as shown in FIG. 10B, which shows the display picture resulting from the change of the restriction initiation remaining battery power P1. Then, the processing A (FIG. 8A) at Step 512 of FIG. 7 is executed, which results in changes of the indications of the set telephone voice communication time T2, the set incoming call awaiting time T4 and the set application operating time T6 of the application AP9, as shown in FIG. 10C, which shows the display picture after the re-computation.

FIGS. 11A, 11B and 11C show an example of how the power management picture changes when the set telephone voice communication time T2 is changed through the processing B at Step 514 of FIG. 7. When the processing to display the power management picture is called by the user, the display 150 displays the initial picture for the power management shown in FIG. 11A showing the present state of the power management. In this example, the present remaining battery power P10 is 60%. The present set telephone voice communication time T2 is set at sixty (60) minutes. Then, when the user operates the input keys 152 and the control keys 154 to change, for example, the set telephone voice communication time T2 to forty (40) minutes in order to shorten the set telephone voice communication time T2, as shown in FIG. 11B, which shows the display picture resulting from the change of the set telephone voice communication time T2. Then, the processing B at Step 514 in FIG. 7 is executed, which results in changes of the indications of the restriction initiation remaining battery power P1, the remaining telephone voice communication time T3, the set incoming call awaiting time T4, the present remaining incoming call awaiting time T5, the set application operating time T6 for the application AP9, and the remaining available operating time T7, as shown in FIG. 11C, which shows the display picture after the re-computation.

FIGS. 12A, 12B and 12C show an example of how the power management picture changes when the remaining available operating time T7 for an application AP9 (music replay) is changed through the processing D at Step 516 of FIG. 7. When the processing to display the power management picture is called by the user, the display 150 displays the initial display picture for the power management shown in FIG. 12A showing the present state of the power management. In this example, the present remaining battery power P10 is 60%. The present remaining available operating time T7 for the application AP9 is twenty (20) minutes. Then, the user uses the input keys 152 and the control keys 154 to, for example, change the remaining available operating time T7 to sixty (60) minutes in order to replay music for sixty (60) minutes, as shown in FIG. 12B, which shows the display picture resulting from the change of the remaining available application operating time T7. Then, the processing D in FIG. 7 is executed, which results in changes of the indications of the restriction initiation remaining battery power P1, the set telephone voice communication time T2, the remaining telephone voice communication time T3, the set incoming call awaiting time T4, the present remaining incoming call awaiting time T5 and set application operating time T6, as shown in FIG. 12C, which shows the display picture after the re-computation.

Figures 13A, 13B, 13C:
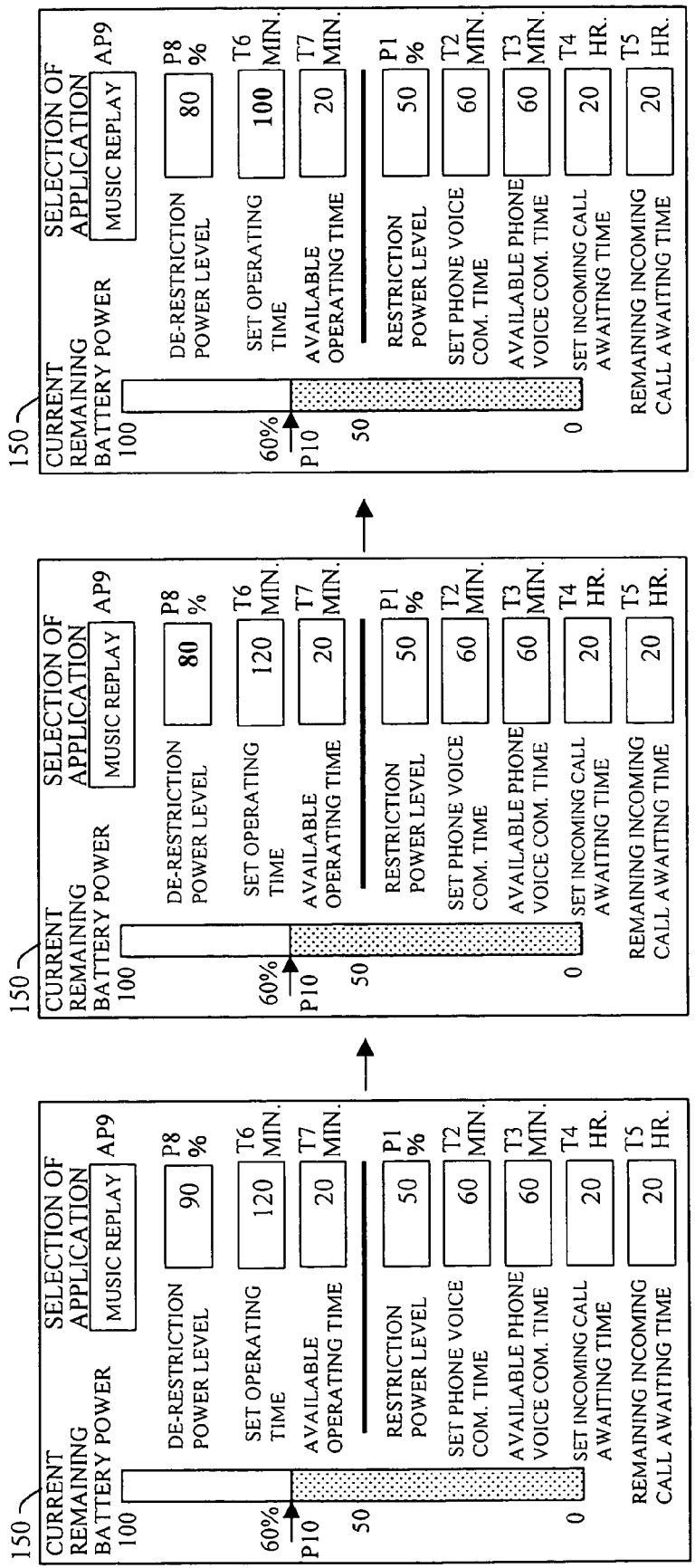
FIGS. 13A, 13B and 13C show an example of how the power management picture changes when the de-restriction remaining battery power P8 is changed through the processing D of FIG. 7.

FIGS. 13A, 13B and 13C show an example of how the power management picture changes when the de-restriction remaining battery power P8 is changed through the processing D at Step 516 of FIG. 7. When the processing to display the power management picture is called by the user, the display 150 displays the initial display picture for the power management shown in FIG. 13A showing the present state of the power management. In this example, the present remaining battery power P10 is 60%. The remaining battery power P8 at which the function is to be de-restricted is set at 90% of the fully charged state. Then, the user uses the input keys 152 and the control keys 154 to change, for example, the de-restriction remaining battery power P8 to 80% so that the application AP9 can be used as soon as possible after the initiation of function restriction and the subsequent initiation of the charging, as shown in FIG. 13B, which shows the change of the de-restriction remaining battery power P8. Then, the processing E shown in FIG. 7 is executed, which results in changes of the displayed set application operating time T6 as shown in FIG. 13C, which shows the display picture after the re-computation.

FIGS. 14A, 14B and 14C show an example of how the power management picture changes when the application AP9 is changed through the processing F at Step 520 of FIG. 7. When the processing to display the power management picture is called by the user, the display 150 displays the initial display picture for the power management shown in FIG. 14A showing the present state of the power management. In this example, the present remaining battery power P10 is 60%. The currently set application AP9 is music replay. Then, when the user operates the input keys 152 and the control keys 154 to change, for example, the application AP9 to the Game 1 so that the user can play a game on the electronic apparatus 100 or 102, as shown in FIG. 14B which shows the display picture resulting from the change of the application AP9. Then, the processing F at Step 522 in FIG. 7 is executed, which results in changes of the indications of the set operating time T6 for the changed application AP9 and the remaining available operating time T7, as shown in FIG. 14C, which shows the display picture after the re-computation.

Figure 15:
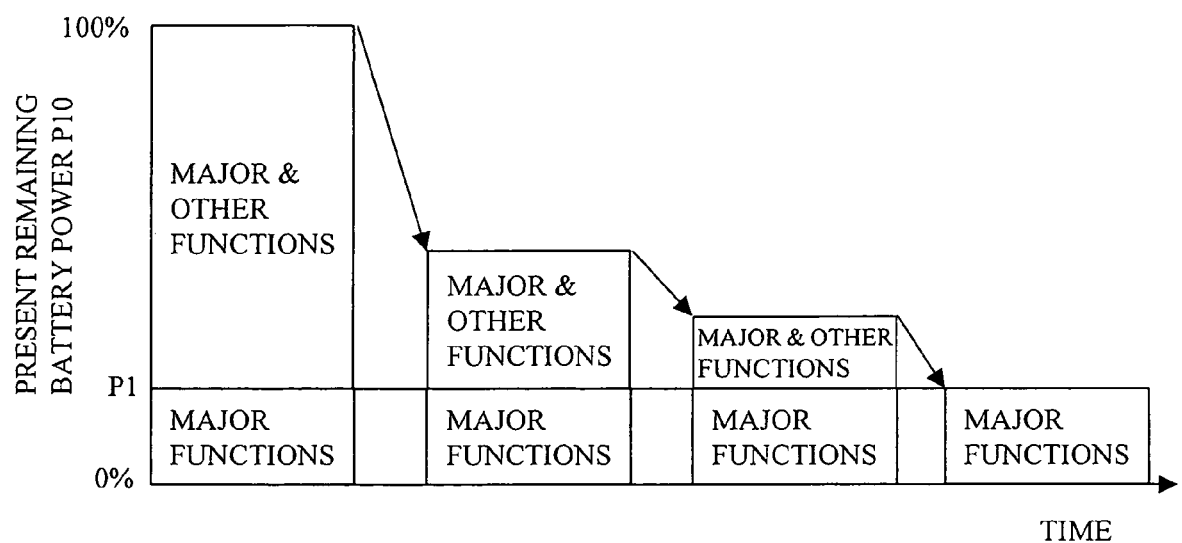
FIG. 15 shows battery power allocation of the remaining battery power P10 of the mobile electronic apparatus between the major functions and the other supplementary functions, according to the embodiments.

FIG. 15 shows battery power allocation of the remaining battery power P10 of the mobile electronic apparatus 100 or 102 between the major functions 124, such as given incoming call awaiting and telephone voice communication functions, and other supplementary functions 126, according to the embodiments of the invention described above. In the embodiments, when the present remaining battery power P10 gradually decreases to the restriction initiation remaining battery power P1 at which the function restriction is to be initiated, due to the major and other functions of the mobile electronic apparatus 100 or 102 being enabled, the present remaining battery power P10=P1 can be secured for the apparatus 100 or 102 to perform only the major functions 124 for a minimum operating time, and also the user can freely use the battery power difference obtained by subtracting the restriction initiation remaining battery power P1 from the present remaining battery power P10 (P10-P1), for the major functions 124 and the supplementary functions 126. In this manner, the battery power required for the major functions 124 can be prevented from being inadvertently used up by the user for ones of the supplementary functions 126.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. An electronic apparatus comprising:

an information processing unit, a memory coupled to said information processing unit, an RF communication unit coupled to said information processing unit, an audio circuit coupled to said information processing unit, a display, an information reception unit receiving user input information, a secondary battery, a detector detecting battery power remaining on said secondary battery;

said information processing unit including a power manager managing the power of said secondary battery, and an information type determination unit determining a type of information received by said information reception unit and having at least one major function and a supplementary function, said memory storing power consumption rates corresponding to the at least one major function and the supplemental function;

said power manager initiating restriction of the supplementary function, if a present remaining battery power of said secondary battery as detected by said detector is below a predetermined threshold;

said power manager computing the predetermined threshold for said secondary battery in accordance with the information received by the information reception unit and the power consumption rates corresponding to the at least one major function, if the information type determination unit determines that the type of the information received by the information reception unit is a set operating time for securing the at least one major function;

said power manager computing a set operating time for the at least one major function according to the remaining battery power at the predetermined threshold in accordance with the information received by the information reception unit and the power consumption rates corresponding to the at least one major function, if the information type determination unit determines that the type of information received by the information reception unit is the predetermined threshold for said secondary battery;

said power manager computing an operating time available for the at least one major function in accordance with the remaining battery power of said secondary battery as detected by said detector and the power consumption rates corresponding to the one or more major functions;

said power manager computing an operating time available for the supplemental function in accordance with the power consumption rate corresponding to the supplemental function by subtracting the predetermined threshold from the remaining battery power of said secondary battery as detected by said detector; and said power manager displaying, on said display, the present remaining battery power of said secondary battery, the predetermined threshold, the operating time available for the at least one major function and the operating time available for the supplementary function.

2. The electronic apparatus according to claim 1, wherein the at least one major function includes an incoming call awaiting function and a telephone voice communication function.

3. The electronic apparatus according to claim 1, wherein if the remaining battery power of said secondary battery as detected by said detector is below the predetermined threshold, said power manager computes and displays, on said display, the set operating time for the at least one major function for the remaining battery power at the predetermined threshold and the available operating time for the at least one major function for the present remaining battery power of said secondary battery.

4. The electronic apparatus according to claim 1, wherein said power manager computes the set operating time for the at least one major function in accordance with the predetermined threshold set by a user, and displays the computed set operating time for the at least one major function on said display.

5. The electronic apparatus according to claim 1, wherein said power manager computes the operating time available for the supplementary function in accordance with the predetermined threshold set by a user and with the present remaining battery power, and displays the computed operating time available for the supplementary function on said display.

6. The electronic apparatus according to claim 1, wherein said power manager computes the predetermined threshold in accordance with the set operating time for the at least one major function set by a user, and displays the computed threshold on said display.

7. The electronic apparatus according to claim 1, wherein said power manager computes the predetermined threshold and the operating time available for the supplementary function, in accordance with the set operating time for the at least one major function set by a user and with said present remaining battery power, and displays the computed threshold and the computed operating time available for the supplementary function on said display.

8. The electronic apparatus according to claim 1, wherein said power manager computes the predetermined threshold and the set operating time for the at least one major function, in accordance with the operating time available for the supplementary function set by a user and with the present remaining battery power, and displays the computed threshold and the computed set operating time for the at least one major function on said display.

9. The electronic apparatus according to claim 1, wherein if the supplementary function is selected, said power manager computes and displays, on said display, the operating time available for the supplementary function.

10. The electronic apparatus according to claim 1, wherein if the incoming call awaiting function as the at least one major function is being performed, at least one of said detector, an LED backlight and a vibrator is disabled.

11. The electronic apparatus according to claim 1, wherein, if the present remaining battery power of said secondary battery as detected by said detector is below the predetermined threshold, said power manager indicates on said display that the supplementary function is currently unavailable.

12. The electronic apparatus according to claim 1, wherein, if the present remaining battery power exceeds another threshold, at which the supplementary function is to be de-restricted, through the charging of said secondary battery after the initiation of restriction of the supplementary function, said power manager de-restricts the supplementary function.

13. The electronic apparatus according to claim 1, wherein said power manager computes the set operating time for the supplementary function, in accordance with remaining battery power which is equal to the difference between the predetermined threshold, at which restriction of the supplementary function is to be initiated, and another threshold, at which the supplementary function is to be de-restricted, and displays the computed set operating time for the supplementary function on said display.

14. An electronic apparatus comprising:
an information processing unit,
a memory coupled to said information processing unit,
an RF communication unit coupled to said information processing unit, an audio circuit coupled to said information processing unit,
a display,
an information reception unit receiving user input information,
a secondary battery, and
a detector detecting battery power remaining on said secondary battery;
said information processing unit including a power manager managing the power of said secondary battery, and an information type determination unit determining a type of information received by said information reception unit, and having at least one major function and a supplementary function, said memory storing power consumption rates corresponding to the at least one major function and supplemental function;
said power manager generating a warning sound, if when a present remaining battery power of said secondary battery as detected by said detector is below a predetermined threshold;
said power manager computing the predetermined threshold for said secondary battery in accordance with the information received by the information reception unit and the power consumption rates corresponding to the at least one major function, if the information type determination unit determines that the type of the information received by the information reception unit is a set operating time for securing the at least one major function;
said power manager computing a set operating time for the at least one major function according to the remaining battery power at the said predetermined threshold in accordance with the information received by the information reception unit and the power consumption rates corresponding to the at least one major function, if the information type determination unit determines that the type of information received by the information reception unit is the predetermined threshold for said secondary battery;
said power manager computing an operating time available for the at least one major function in accordance with the remaining battery power of said secondary battery as detected by said detector and the power consumption rates corresponding to the at least one major function;
said power manager computing an operating time available for the supplemental function in accordance with the power consumption rate corresponding to the supplemental function by subtracting the predetermined threshold from the remaining battery power of said secondary battery as detected by said detector;
said power manager displaying, on said display, the present remaining battery power of said secondary battery, the predetermined threshold, the operating time available for the at least one major function and the operating time available for the supplementary function.

15. The electronic apparatus according to claim 14, wherein, if the remaining battery power of said secondary battery as detected by said detector is below the predetermined threshold, said power manager computes and displays, on said display, the set operating time for the at least one major function for the remaining battery power at the predetermined threshold and the available operating time for the at least one major function for the present remaining battery power of said secondary battery.

16. The electronic apparatus according to claim 14, wherein said power manager computes the set operating time for the at least one major function in accordance with the said predetermined threshold set by a user, and displays the computed set operating time for the at least one major function on said display.

17. The electronic apparatus according to claim 14, wherein said power manager computes the operating time available for the supplementary function in accordance with the predetermined threshold set by a user and with the present remaining battery power, and displays the computed operating time available for the supplementary function on said display.

18. The electronic apparatus according to claim 14, wherein said power manager computes the predetermined threshold in accordance with the set operating time for the at least one major function set by a user, and displays the computed threshold on said display.

19. The electronic apparatus according to claim 14, wherein said power manager computes the predetermined threshold and the operating time available for the supplementary function, in accordance with the set operating time for the at least one major function set by a user and with the present remaining battery power, and displays the computed threshold and the computed operating time available for the supplementary function on said display.

20. The electronic apparatus according to claim 14, wherein said power manager computes the predetermined threshold and the set operating time for the at least one major function, in accordance with the operating time available for the supplementary function set by a user and with the present remaining battery power, and displays the computed threshold and the computed set operating time for the at least one major function on said display.

* * * * *

UNITED STATES PATENT AND TRADEMARK OFFICE
CERTIFICATE OF CORRECTION

| | |
|---|---|
| PATENT NO. | : 7,528,577 B2 |
| APPLICATION NO. | : 11/443204 |
| DATED | : May 5, 2009 |
| INVENTOR(S) | : Yasushi Hara et al. |

It is certified that error appears in the above-identified patent and that said Letters Patent is hereby corrected as shown below:

Column 15, Line 5, change "wherein" to --wherein,--.

Column 15, Line 47, change "wherein" to --wherein,--.

Column 15, Line 51, change "wherein" to --wherein,--.

Column 16, Line 31, before "a" delete "when".

Signed and Sealed this

Fifteenth Day of September, 2009

David J. Kappos
*Director of the United States Patent and Trademark Office*